(12) United States Patent
Ito

(10) Patent No.: US 8,345,298 B2
(45) Date of Patent: Jan. 1, 2013

(54) PRINT CONTROL APPARATUS, FOR PERFORMING A PRINTING OPERATION BY REUSING RENDERING COMPLETED DATA

(75) Inventor: Yousuke Ito, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 12/624,199

(22) Filed: Nov. 23, 2009

(65) Prior Publication Data

US 2010/0134844 A1 Jun. 3, 2010

(30) Foreign Application Priority Data

Nov. 28, 2008 (JP) ................................. 2008-304796

(51) Int. Cl.
*G06F 15/00* (2006.01)
*G06K 1/00* (2006.01)
*G06K 15/00* (2006.01)
*G06F 3/12* (2006.01)

(52) U.S. Cl. ....................................... 358/1.17; 358/1.13
(58) Field of Classification Search ......................... None
See application file for complete search history.

(56) References Cited

U.S. PATENT DOCUMENTS

| 8,059,296 B2 * | 11/2011 | Hayashi | 358/1.15 |
| 2006/0187488 A1 | 8/2006 | Sakamoto | |
| 2009/0028437 A1 * | 1/2009 | Hirohata | 382/201 |

FOREIGN PATENT DOCUMENTS

| JP | 10-021018 A | 1/1998 |
| JP | 2006-237825 A | 9/2006 |

* cited by examiner

*Primary Examiner* — Douglas Tran
(74) *Attorney, Agent, or Firm* — Canon USA Inc. IP Division

(57) ABSTRACT

In determining whether to use RIP completed data, a print control apparatus determines whether objects constituting a processing target page are all reusable objects. As a result of this determination, if it is not determined that the objects constituting the processing target page are all reusable objects, the print control apparatus performs RIP on the processing target page data without using the RIP completed data. On the other hand, if the objects constituting the processing target page are all reusable objects, it is then determined whether a registered common page matching the processing target page is present in a common page table. As a result of this determination, if the registered common page is present, the print control apparatus reuses the RIP completed data. If the registered common page is not present, the print control apparatus performs the RIP on the processing target page without using the RIP completed data.

11 Claims, 16 Drawing Sheets

FIG. 12

| | RESOURCE ID 601 | TRANSITION HISTORY 602 | CUMULATIVE NUMBER OF TIMES 603 | POINTER 604 |
|---|---|---|---|---|
| | 001 (PAGE A) | A→B: THREE TIMES (3) | THREE TIMES | 0x02 |
| | 002 (PAGE B) | A→B→C: TWO TIMES (1) F→B→D: ONE TIME (2) | ZERO TIME | 0x2a |
| | 003 (PAGE C) | - | (3) | 0x46 |
| | 004 (PAGE F) | F→B: ONE TIME (3) | ONE TIME | 0x91 |
| | 005 (PAGE D) | - | (3) ZERO TIME | 0x6c |

507

FIRST RECORD / SECOND RECORD / THIRD RECORD / FOURTH RECORD

COMMON PAGE FIRST PAGE: [A] [A] [F] [A] — 1201

COMMON PAGE SECOND PAGE: [B] [B] [B] — 1203

COMMON PAGE THIRD PAGE: [C] [C] —

PROCESSING OBJECT PAGE: [D] [?] — 1202, 1204

PRINT CONTROL APPARATUS, FOR PERFORMING A PRINTING OPERATION BY REUSING RENDERING COMPLETED DATA

BACKGROUND OF THE INVENTION

1. Field of the Invention

The present invention relates to a print control apparatus, a print control method, and a computer program. More specifically, the present invention relates to a technique capable of effectively performing a printing operation by reusing rendering completed data.

2. Description of the Related Art

Recent electro-photographic printing apparatuses and ink-jet printing apparatuses could operate speedily and output high-quality images.

A business model newly introduced for such advanced printing apparatuses is called "Print On Demand (POD)." Digital printing machines can be used for the POD because these machines can accept an order of a relatively small lot of job, which cannot be accepted by the conventional printing industry that is basically based on a business model using a large-scale printing apparatus.

As a derivative of the POD, a method generally referred to as Variable Data Print (VDP) is usable for the digital printing machines. According to the VDP, the contents to be printed for each printout product can be flexibly changed with reference to information stored in a database.

More specifically, the VDP is preferably used to print direct mails whose contents need to be changed according to customer information. The direct mails, for example, include information of commodities that can be changed according to preference of each customer or numerical values that are variable according to a usage status, for example, expenses for light and fuel.

Therefore, the VDP is widely used in various markets in which direct mails are frequently generated.

The Personalized Print Markup Language (PPML) is a standard format that can be used to describe a print job for the VDP. As one of characteristic features of the PPML, rendering objects that can be reused in rendering processing are described differently from other rendering objects that are used only one time for the rendering processing.

As described above, the VDP enables to flexibly change the contents to be printed for each printout product with reference to information stored in a database.

In this case, an actual print job may contain similar page contents that are commonly usable among a plurality of records. For example, in a catalog of commodities including customized contents for each customer, an ordering page that describes how to purchase commodities is an example of the common pages.

Another method that is generally referred to as "versioning" enables to replace the contents of a specific page according to each client to generate a customized print job. More specifically, according to the "versioning", the contents to be printed can be replaced on a page-by-page basis (e.g., a page A for a female customer and a page B for a male customer).

The above-described pages containing common contents can be subjected to Raster Image Processing (RIP) to obtain RIP completed data. The obtained RIP completed data can be cached in a memory of a printer or a hard disk drive (HDD). The stored data can be reused to speedily accomplish printing processing.

However, to this end, it is required to check whether the RIP completed data that corresponds to a current processing target page to be subjected to the RIP is already cached.

Hereinafter, it is now assumed that a Page Description Language (PDL) script is subjected to the RIP. The grammar of the PDL enables to describe information indicating a relationship between two or more pages that are mutually common.

In the RIP performed on the PDL script, information indicating each cache completed page is stored in a printer. The information stored in the printer and the PDL script information can be used to promptly determine whether the current processing target page to be subjected to the RIP is already cached.

However, the grammar of the above-described PPML script does not enable to describe information indicating a relationship between two or more pages that are mutually common.

Accordingly, to determine whether the current processing target page to be subjected to the RIP is already cached, it is required to perform matching determination processing to determine whether a script of the current processing target page to be subjected to the RIP matches with a script that corresponds to the page stored in a cache.

However, if the amount of calculations increase for the matching determination processing, the effects obtained by the page cache processing may be reduced greatly.

A technique discussed in Japanese Patent Application Laid-Open No. 10-021018 is a conventional technique that can cache the processing data on the page-by-page basis. The technique discussed in Japanese Patent Application Laid-Open No. 10-021018 divides the PDL data into a plurality of page data and caches the divided page data. Then, each page data is compared with previous data.

Further, according to the technique discussed in Japanese Patent Application Laid-Open No. 10-021018, if the compared data match with each other as a result of the comparison, then the previous RIP completed data is used for the matched page and execution of the RIP is cancelled.

Thus, the technique discussed in Japanese Patent Application Laid-Open No. 10-021018 can reduce the time required to rasterize printing data in an insertion printing to be performed on the page-by-page basis.

A technique discussed in Japanese Patent Application Laid-Open No. 2006-237825 includes extracting reusable data of each object that can be commonly used for a plurality of pages and combining the extracted reusable data to generate form data. Then, the technique discussed in Japanese Patent Application Laid-Open No. 2006-237825 further includes combining the generated form data with data of an object that is not included in the form data, to perform printing.

However, the technique discussed in Japanese Patent Application Laid-Open No. 10-021018 intends to perform the above-described page cache processing for every PDL object. Therefore, it is required to cache all pages included in a print job and perform comparison processing. The number of times of the matching determination tends to increase.

The technique discussed in Japanese Patent Application Laid-Open No. 2006-237825 requires to generate, beforehand, a list of objects in relation to pages on which the objects appear, to quickly find an object that can be commonly used among two or more pages.

Further, to generate the list, the number of times of the matching determination to be performed between the objects tends to increase.

As described above, to cache RIP completed data of a common page in the processing of a job described by the PPML, it is required to perform matching determination processing between a script of the current processing target page to be subjected to the RIP and a script that corresponds to the page stored in the cache.

However, the above-described conventional technique requires the above-described matching determination processing to be constantly performed. Further, the above-described matching determination processing requires a large amount of calculations. Therefore, the effects obtainable by the page-by-page basis cache may be reduced.

SUMMARY OF THE INVENTION

Exemplary embodiments of the present invention are directed to a technique capable of simplifying the processing for caching rendered data on the page-by-page basis and reusing the cached rendered data.

According to an aspect of the present invention, a print control apparatus that includes an analysis unit configured to analyze a script containing page data described using a language that can describe reusable objects and variable objects differently from each other; an extraction unit configured to extract page data constituted by reusable objects only, from the page data described in the script; a generation unit configured to generate rendering processing completed data by performing rendering processing on the page data extracted by the extraction unit; a storage unit configured to store the rendering processing completed data generated by the generation unit in association with page data serving as a generation source of the rendering processing completed data in a storage medium; a determination unit configured to compare the page data extracted by the extraction unit with page data already stored in the storage medium to determine whether the page data extracted by the extraction unit matches the page data already stored in the storage medium; and an output unit configured to output rendering processing completed data already stored in the storage medium in association with the page data in a case where the determination unit determines that the page data extracted by the extraction unit matches with the page data already stored in the storage medium, instead of causing the generation unit to generate the rendering processing completed data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates an example of the processing to be performed in step S1003 of FIG. 10.

DESCRIPTION OF THE EMBODIMENTS

Figure 1:
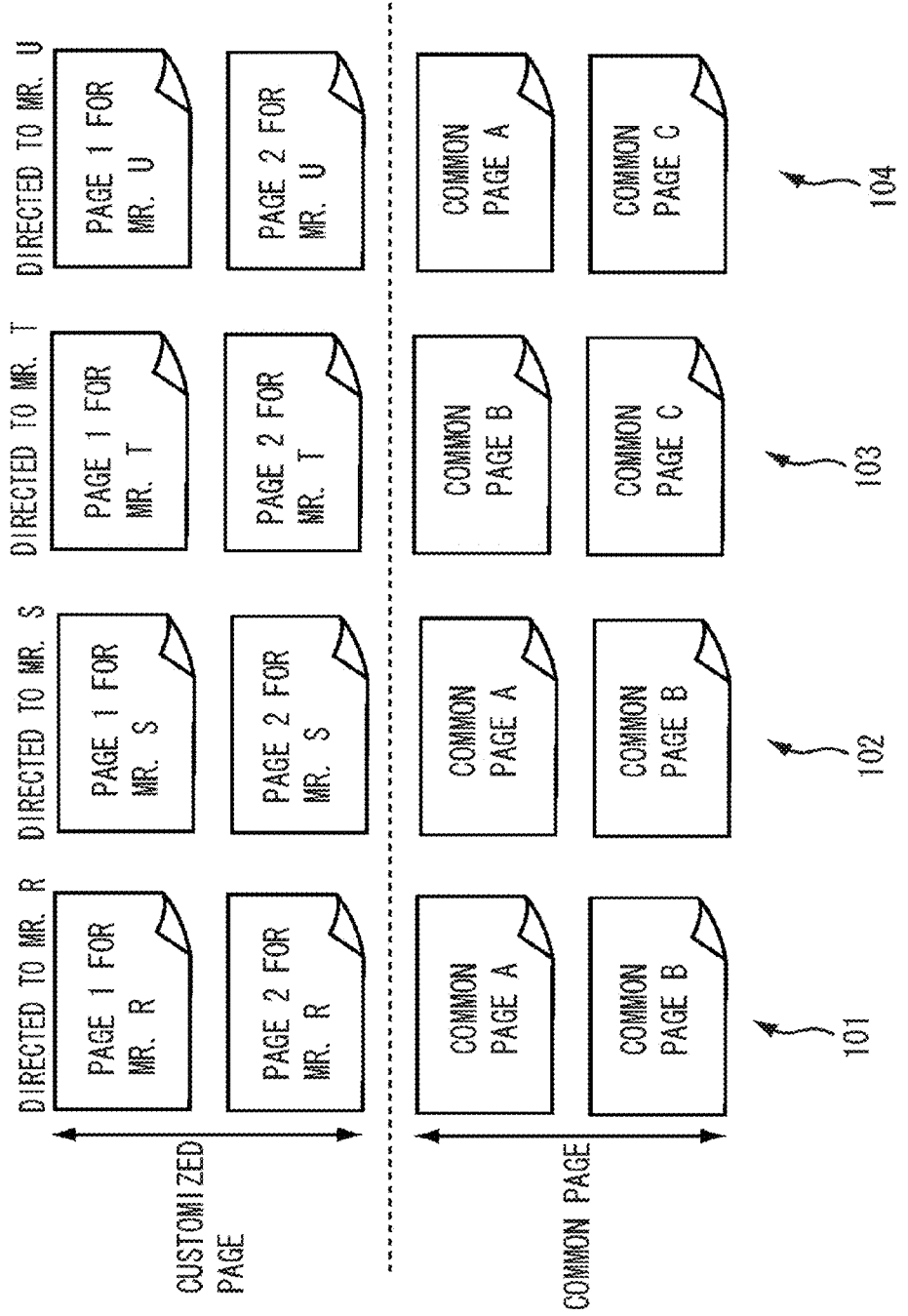
FIG. 1 illustrates an example of a print job including common pages.

Various exemplary embodiments, features, and aspects of the invention will be described in detail below with reference to the drawings.

A first exemplary embodiment of the present invention is described below with reference to the drawings. Taking the grammar of the PPML into consideration, the present exemplary embodiment provides a measure for reducing the number of times of the matching determination to be performed between pages that are compared as well as a measure for reducing the number of times of the matching determination to be performed between two or more objects.

As described above, the PPML can describe rendering objects that can be reused for the rendering processing differently from other rendering objects that are used only one time for the rendering processing.

The following two measures are available to reduce the number of times of the matching determination to be performed between pages that are compared.

The first measure is a measure including processing for selecting common page candidates beforehand. The first measure does not require performing the matching determination between all pages and the cached pages.

Accordingly, the first measure can reduce the number of times of the matching determination to be performed between pages that are compared. An example of processing relating to the first measure is described below with reference to FIG. 9.

The second measure is a measure including processing for determining an order of pages to be subjected to the matching determination considering a transition of pages. The second measure is a measure including processing for performing page matching determination processing in order starting from a page having the highest matching possibility.

Accordingly, the second measure can quickly find a matched page. As a result, the second measure can reduce the number of times of the matching determination to be performed between pages that are compared. An example of processing relating to the second measure is described below with reference to FIGS. 11 and 12.

Next, the following two measures are available to reduce the number of times of the matching determination to be performed between two or more objects.

The first measure is a measure including processing for comparing a byte number of a page already stored with a byte number of a page to be subjected to RIP and then performing the matching determination between the actual objects.

Thus, the first measure can omit the object matching determination if two compared pages are different in the byte number. Therefore, the first measure can reduce the number of times of the matching determination to be performed between two or more objects. An example of processing relating to the first measure is described below with reference to FIG. 13.

The second measure is a measure including processing for performing the matching determination by prioritizing an object serving as a foreground of a page. The second measure can quickly find an unmatched object in the object matching determination performed between two common pages that are similar in the background but different in the foreground.

Therefore, the second measure can reduce the number of times of the matching determination to be performed between two or more objects. An example of processing relating to the second measure is described below with reference to FIG. 14.

First, a definition of the common page is described below. FIG. 1 illustrates a conceptual arrangement of a print job that includes a plurality of pages. Four records 101 to 104 illustrated in FIG. 1 are dedicated to four different persons. Each of the records 101 to 104 includes common pages. According to the example illustrated in FIG. 1, each record includes two customized pages and two common pages.

In the present exemplary embodiment, the customized page is a page that is personalized for each record. In the present exemplary embodiment, not only the pages common to all records but also the pages common to a limited part of the records can be referred to as the common pages as illustrated in this example.

Figure 2:
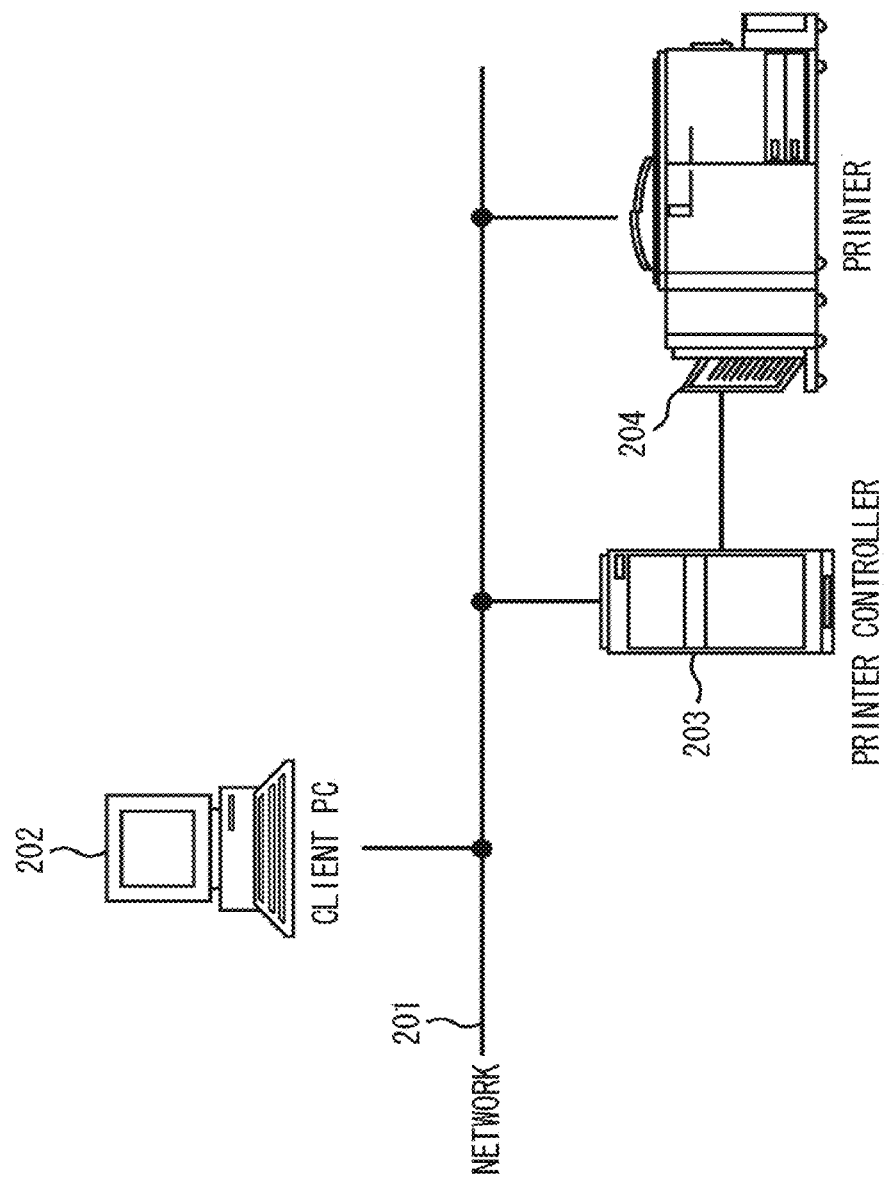
FIG. 2 illustrates an example of a schematic configuration of a printing system according to an exemplary embodiment of the present invention.

Next, a configuration of the printing system according to the present exemplary embodiment is described below. FIG. 2 illustrates an example of a schematic configuration of the printing system. The printing system illustrated in FIG. 2 includes at least one client personal computer (hereinafter, referred to as a client PC) 202, a printer controller 203, and a printer 204 that are mutually connected via a network 201.

The client PC 202 can generate a print job described by the PPML (hereinafter, referred to as a PPML job) and can transmit the generated PPML job to the printer controller 203 via the network 201. The printer controller 203 can receive the PPML job from the client PC 202 and can perform raster image processing (RIP) on page data of each page of the PPML job to generate RIP completed data.

In the present exemplary embodiment, the printer controller 203 can reuse the cached RIP completed data for a common page whose RIP completed data is already cached. The printer controller 203 can transmit the RIP completed data to the printer 204. The printer 204 has a printer engine that can print the received RIP completed data on a paper.

Figure 3:
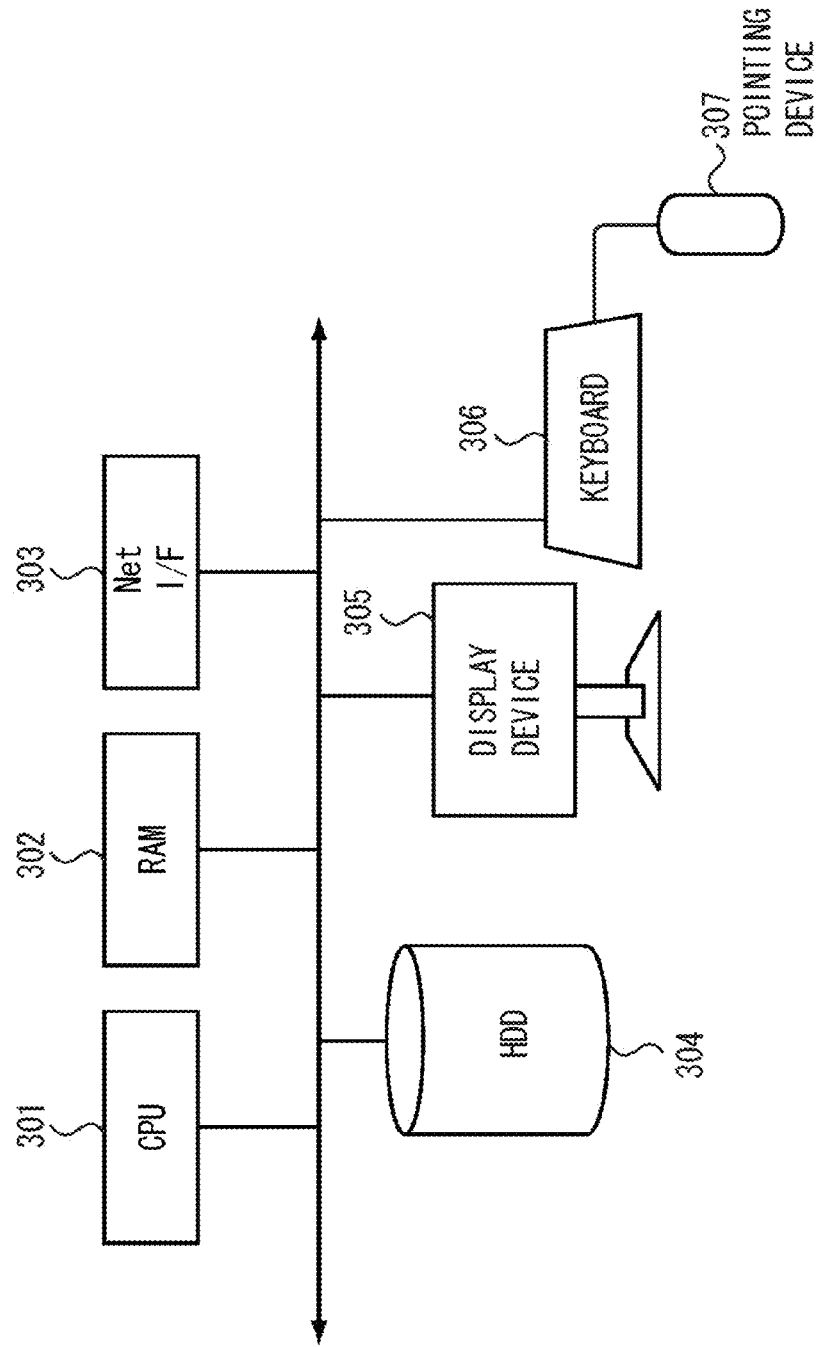
FIG. 3 illustrates an example of a hardware configuration of a client PC according to an exemplary embodiment of the present invention.

Next, a hardware configuration of the client PC 202 according to the present exemplary embodiment is described below. FIG. 3 is a block diagram illustrating an example of the hardware configuration of the client PC 202. The hardware configuration of the client PC 202 illustrated in FIG. 3 is a mere example.

As another example different from the configuration illustrated in FIG. 3, various connection methods are generally employable to realize a hardware configuration of the client PC. Further, as another example different from the configuration illustrated in FIG. 3, a client PC including various buses and interfaces is usable.

A central processing unit (CPU) 301 can perform an overall control for the client PC 202 according to a control program that can be loaded in a random access memory (RAM) 302. The RAM 302 is an internal storage device.

The CPU 301 can execute the control programs for the client PC 202. Both the document and image data can be rasterized (written) into the RAM 302.

Under the control of the CPU 301, a network interface (Net I/F) 303 can transmit and receive various data to and from an external device connected via the network 201 (e.g., Internet or a local area network (LAN)).

A hard disk drive (HDD) 304 can store various data including control software programs for the client PC 202.

The client PC 202 further includes a display device 305, a keyboard 306, and a pointing device 307 (e.g., a mouse).

If necessary, various software programs stored in the HDD 304 can be loaded into the RAM 302. Similarly, if necessary, a function of the operating system can be used in a state where the function of the operating system is loaded into the RAM 302 and can be executed under the control of the CPU 301.

Figure 4:
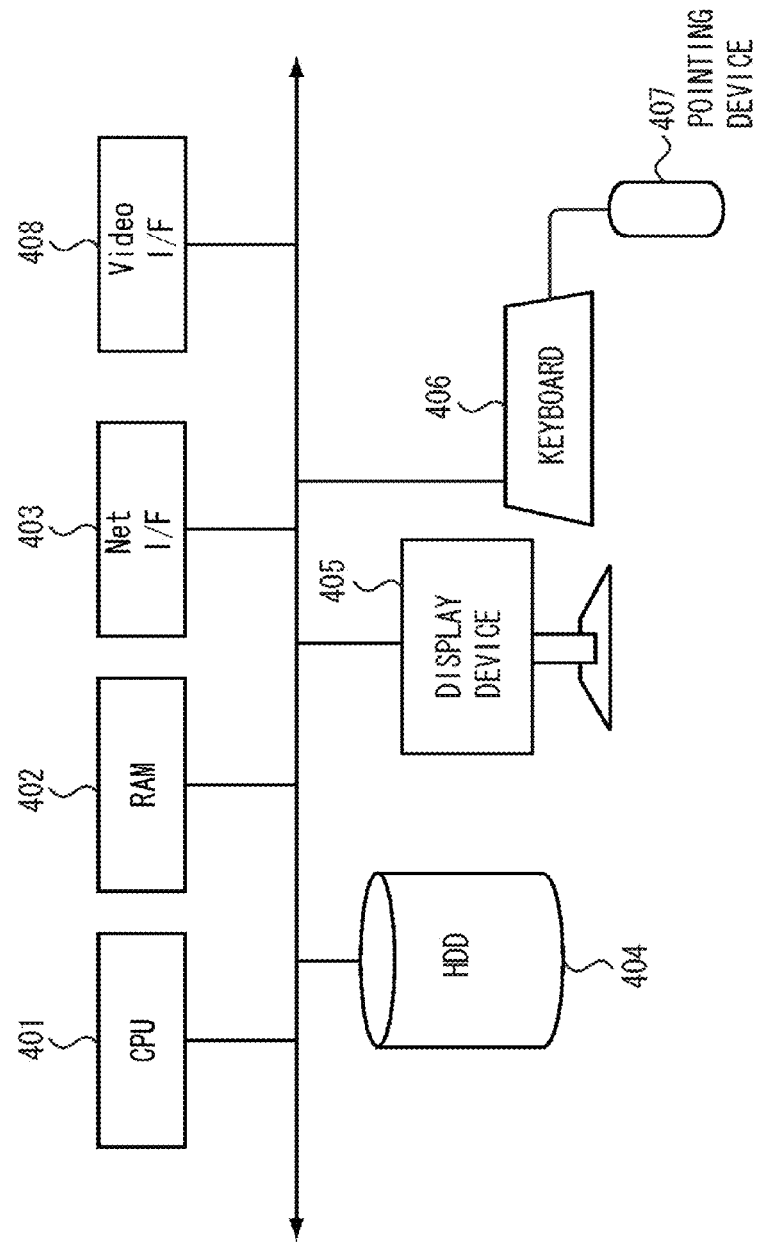
FIG. 4 illustrates an example of a hardware configuration of a printer controller according to an exemplary embodiment of the present invention.

Next, a hardware configuration of the printer controller 203 is described below. FIG. 4 is a block diagram illustrating an example of the hardware configuration of the printer controller 203 that can be used in the present exemplary embodiment. Similar to the client PC 202, the hardware configuration of the printer controller 203 illustrated in FIG. 4 is a mere example. Various connection methods and various hardware configurations including buses and interfaces can be employed.

A CPU 401 can perform an overall control for the printer controller 203 accordingly to a control program that can be loaded in a RAM 402. The RAM 402 is an internal storage device. The CPU 401 can execute the control programs for the printer controller 203.

Both the document and image data can be rasterized (written) into the RAM 402. Under the control of the CPU 401, a network interface (Net I/F) 403 can transmit and receive various data to and from an external device connected via the network 201.

A hard disk drive (HDD) 404 can store various data including control software programs for the printer controller 203.

A video interface 408, which is connected to the printer 204 via a video cable, can transmit RIP completed data to the printer 204.

The printer controller 203 further includes a display device 405, a keyboard 406, and a pointing device 407 (e.g., a mouse).

If necessary, various software programs stored in the HDD 404 can be loaded into the RAM 402. Similarly, if necessary, a function of the operating system can be used in a state where the function of the operating system is loaded in the RAM 402 and can be executed under the control of the CPU 401.

Figure 5:
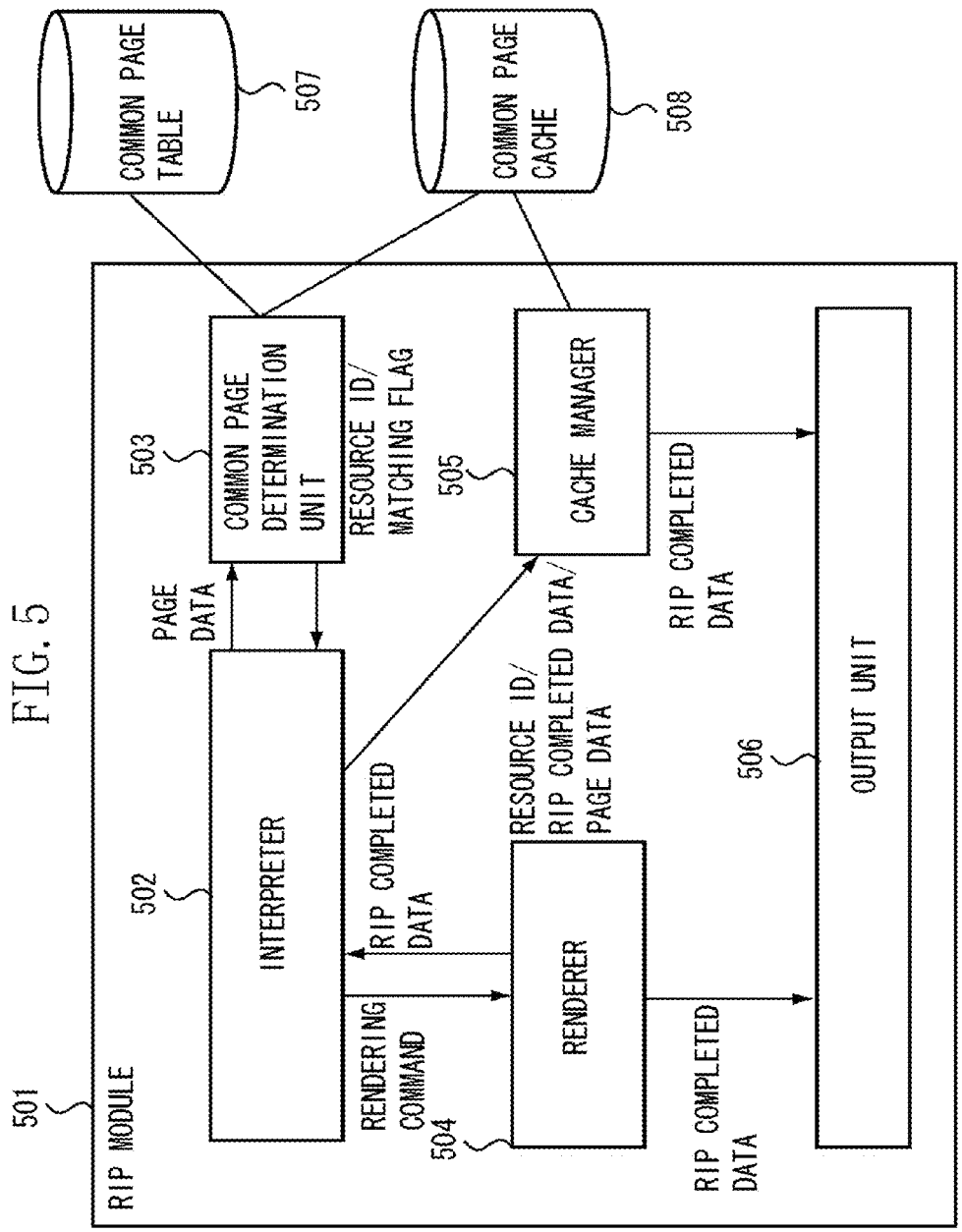
FIG. 5 illustrates an example of a module configuration of a RIP module according to an exemplary embodiment of the present invention.

Next, a module configuration of a RIP module 501 according to the present exemplary embodiment is described below. FIG. 5 illustrates an example of the module configuration of the RIP module 501. The RIP module 501 can be stored in the HDD 404 of the printer controller 203. Further, the RIP module 501 can be appropriately loaded into the RAM 402 from the HDD 404 and can be executed under the control of the CPU 401.

The RIP module 501 includes a common page determination unit 503 that can perform characteristic processing according to an exemplary embodiment. The processing to be performed by the common page determination unit 503 is described below in more detail with reference to FIG. 9.

Next, a module that can constitute the RIP module 501 is described below. An interpreter 502 is a module that can interpret every PPML script. First, the interpreter 502 receives a PPML script from an external module and parses the received PPML script. Then, the interpreter 502 loads (rasterizes) the parsed page data into the RAM 402.

Further, the interpreter 502 sends the parsed page data to the common page determination unit 503. The interpreter 502 receives a determination result from the common page determination unit 503 and determines whether to perform the RIP for a processing target page or output the RIP completed data stored in a cache based on the determination result.

An example flow of the processing to be performed by the interpreter 502 is described below in more detail with reference to FIG. 6.

The common page determination unit 503 determines whether the processing target page received from the interpreter 502 is a common page. The common page determination unit 503 determines whether the processing target page matches with one of the cached common pages.

As described above, the common page determination unit 503 performs characteristic processing according to the present exemplary embodiment. An example flow of the processing to be performed by the common page determination unit 503 is described below in more detail with reference to FIG. 9.

A renderer 504 is a module that can receive a rendering command of the PPML script interpreted by the interpreter 502 and can perform rasterization. The renderer 504 can further select a destination of RIP completed data according to an instruction from the interpreter 502.

More specifically, the renderer 504 can directly transmit the RIP completed data to the output unit 506 or can transmit the RIP completed data to the interpreter 502 to perform cache processing. The renderer 504 transmits the RIP completed data to the selected destination.

A cache manager 505 is a module that can perform a cache management for common pages. The cache manager 505 can perform one of the following two processing operations according to an instruction from the interpreter 502.

The first processing operation includes receiving a cache registration instruction for the RIP completed data of the processing target page from the interpreter 502 and registering the RIP completed data of the processing target page in a common page cache 508.

The second processing operation includes receiving an output instruction for the "RIP completed data of a common page" registered in the common page cache 508 from the interpreter 502 and sending the RIP completed data to the output unit 506.

In the present exemplary embodiment, the RIP completed data is raster data that can be cached. However, in the present invention, the data to be cached is not limited to the raster data. For example, the data to be cached can be any device (e.g., the printer 204) independent data, such as intermediate data.

The output unit 506 is a module that can output RIP completed page data to the printer 204. A common page table 507 is a table that can be used to effectively perform the matching determination between the processing target page and the common pages stored in the common page cache 508.

The common page table 507 can be recorded in the RAM 402 of the printer controller 203. FIG. 6 schematically illustrates an example of a data structure of the common page table 507 according to the present exemplary embodiment.

Figure 6:
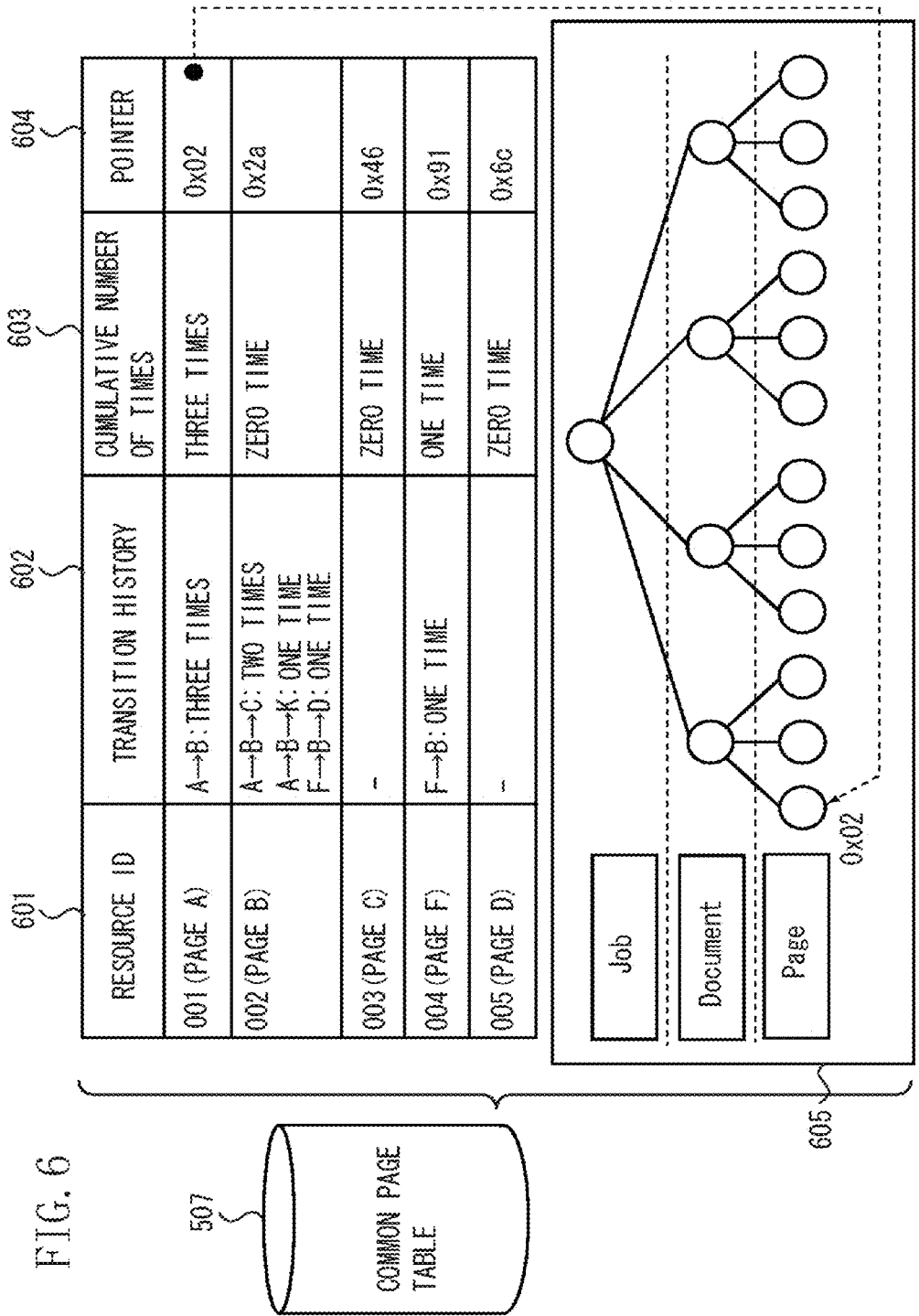
FIG. 6 illustrates an example of a data structure of a common page table according to an exemplary embodiment of the present invention.

In FIG. 6, a resource ID field 601 is a field that can store resource ID data. The resource ID is an ID that can be used to refer to the common page cache 508 that is described below.

A transition history field 602 is a field that indicates an appearance order of common pages. In the following description, if necessary, the contents in the transition history field 602 can be referred to as a transition history. For example, as illustrated in FIG. 6, the transition history field 602 stores transition history data "A→B→C: two times" for a page whose resource ID is 002 (i.e., a common page B).

The transition history indicates that a common page A primarily precedes the page having the resource ID 002 (i.e., the common page B) and a common page C primarily follows the page having the resource ID 002 (i.e., the common page B). The transition history further indicates that the above-described transition has happened two times.

The usage of the above-described transition history is useful to easily and accurately estimate a common page that can match with the processing target page at a higher possibility.

A cumulative number of times field 603 is a field that indicates the number of times (cumulative number of times) of each common page that has appeared on the first page.

A pointer field 604 is a field that indicates a pointer that can point page data 605 of each common page rasterized in the RAM 402 by the parse processing performed by the interpreter 502.

An example of a method for using the common page table 507 is described below with reference to FIGS. 10 to 12.

Figure 7:
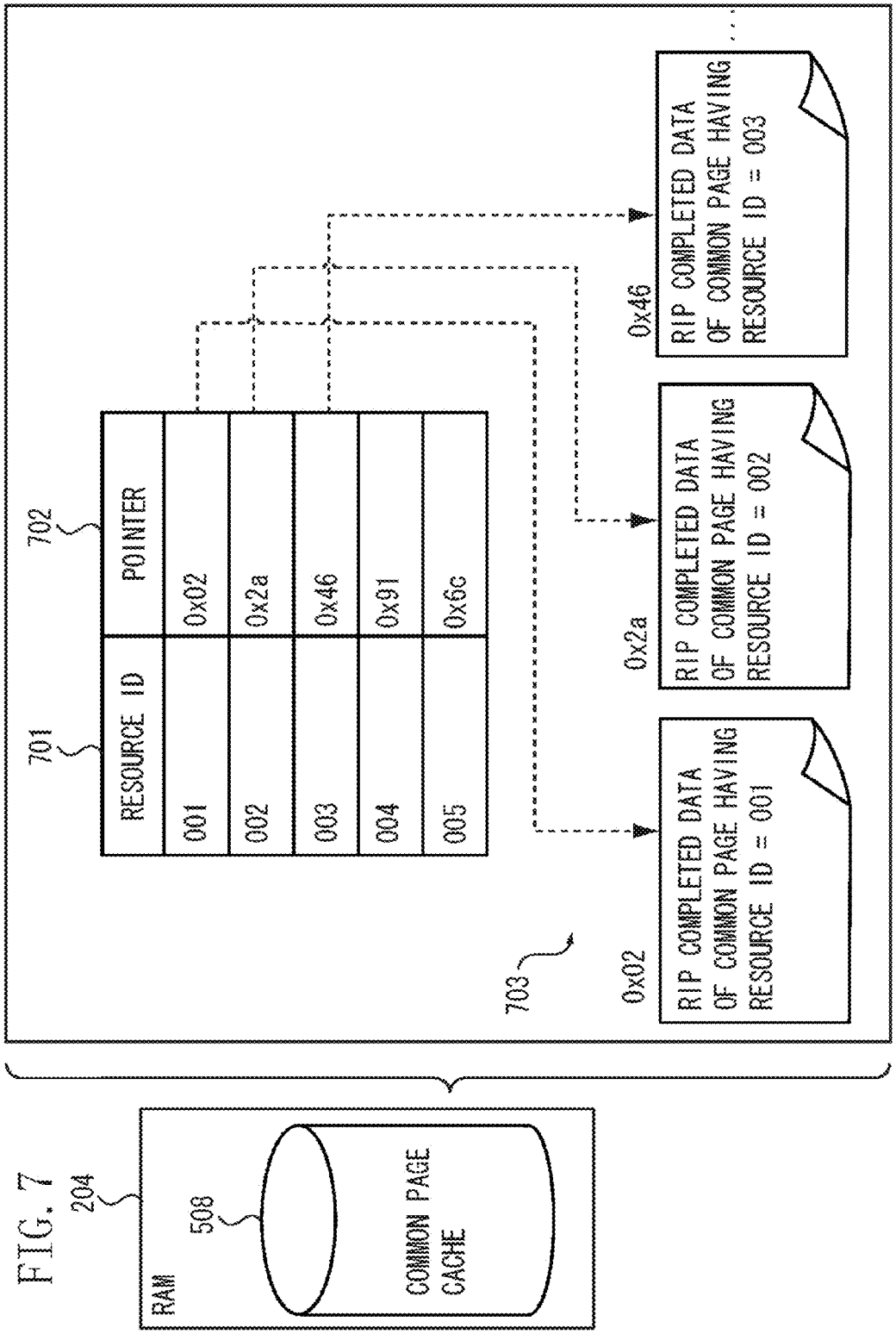
FIG. 7 illustrates an example of a schematic data structure of a common page cache according to an exemplary embodiment of the present invention.

Referring back to FIG. 5, the common page cache 508 has a function for caching RIP completed common page data (RIP completed data). The common page cache 508 can be recorded in the RAM 402. FIG. 7 illustrates an example of a schematic data structure of the common page cache 508 according to the present exemplary embodiment.

In FIG. 7, a resource ID field 701 is a field that can store resource ID data. Each resource ID is an ID that can identify cached page data. The resource ID has a value corresponding to a resource ID in the resource ID field 601 of the common page table 507 illustrated in FIG. 6.

A pointer field 702 is a field that indicates a pointer that can point an RIP completed data 703 rasterized in the RAM 402 of the printer controller 203.

In the present exemplary embodiment, the RIP completed data 703 is stored in the RAM 402. However, the apparatus that can store the RIP completed data 703 is not limited to the RAM 402. For example, the RIP completed data 703 can be stored in the HDD 404 of the printer controller 203. Alternatively, the RIP completed data 703 can be stored in both the RAM 402 and the HDD 404.

In general, the RAM 402 is superior to the HDD 404 in data accessing speed. Therefore, in a case where both the RAM 402 and the HDD 404 are used to store the RIP completed data 703, it is desired to store the RIP completed data 703 in the RAM 402 by a relatively higher percentage to increase the processing speed.

However, the RAM 402 is inferior to the HDD 404 in storage capacity. Therefore, if all of the RIP completed data 703 is stored in the RAM 402, a problem may arise when the capacity of the RAM 402 is insufficient.

Due to the above-described problems, a method for determining whether to store the RIP completed data in the RAM 402 or in the HDD 404 significantly influences a processing efficiency.

An example of the method for determining whether to store the RIP completed data 703 in the RAM 402 or in the HDD 404 is described below. For example, according to the PPML, a weight attribute may be attached to an element (OCCURRENCE_REF), which can be used to refer to a reusable object. In this case, a value of the weight attribute can be referred to in determining whether to store the RIP completed data 703 in the RAM 402 or in the HDD 404.

In this case, an example method according to an exemplary embodiment includes obtaining an average value of the weight attribute values allocated to respective reusable objects that constitute a page and calculating a significance of each page based on the obtained average value. Then, if the amount of the RIP completed data 703 (page) to be cached exceeds the storage capacity of the RAM 402, the method further includes moving the RIP completed data 703 of a page having the lowest significance from the RAM 402 to the HDD 404.

Further, for example, the Least Recently Used (LRU) algorithm or the Least Frequently Used (LFU) algorithm can be used to determine whether to store the RIP completed data 703 in the RAM 402 or in the HDD 404.

In a case where the LRU algorithm is used in the determination, if it is determined that a page has not been reused for the longest time after the latest reuse, the RIP completed data 703 of this page is moved from the RAM 402 to the HDD 404.

On the other hand, in a case where the LFU algorithm is used in the determination, if it is determined that a page has been least frequently used, the RIP completed data 703 of this page is moved from the RAM 402 to the HDD 404.

Figure 8:
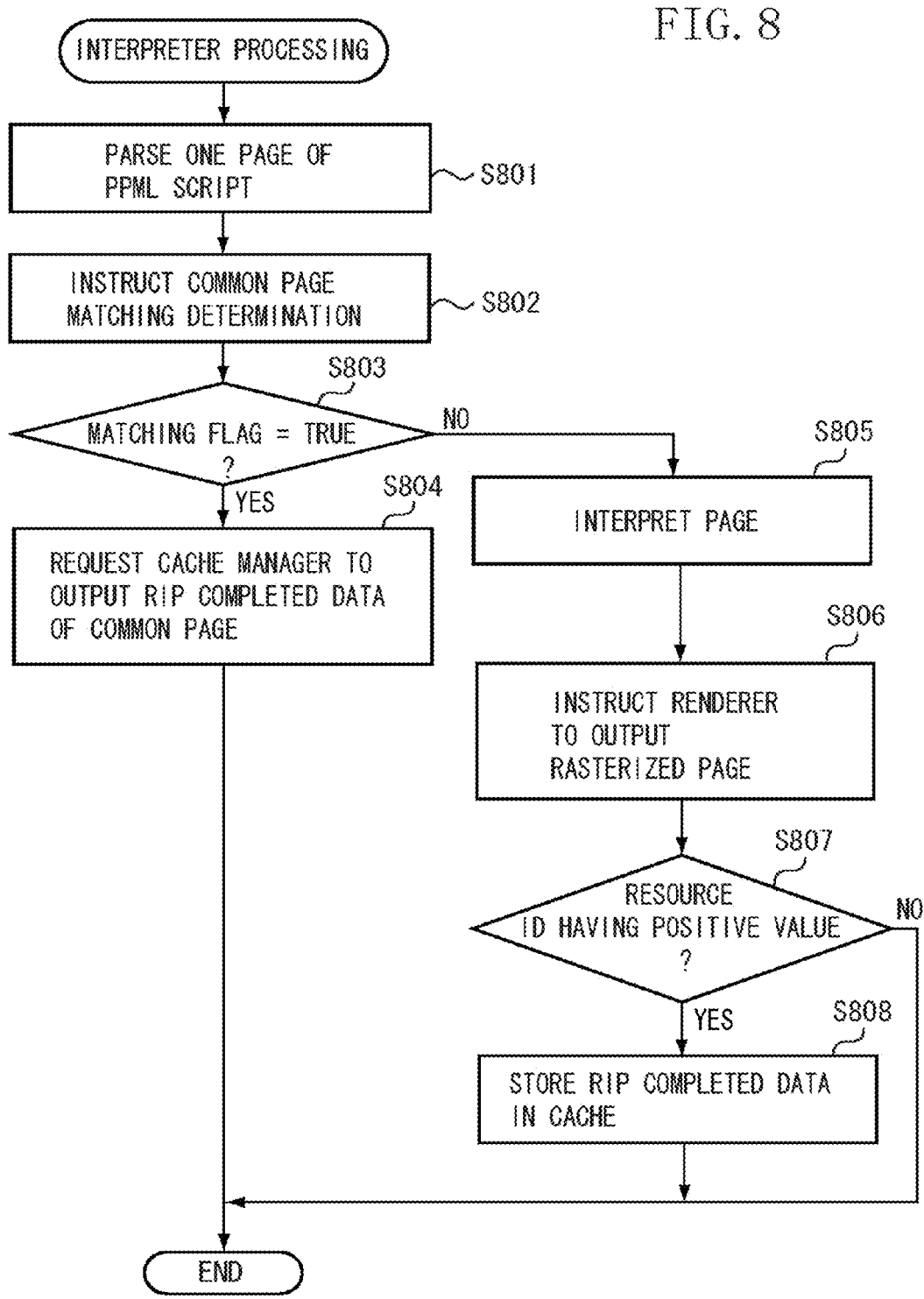
FIG. 8 is a flowchart illustrating an example of processing that can be performed by an interpreter according to an exemplary embodiment of the present invention, when the interpreter performs RIP on data of one page.

Next, an example of the RIP that can be executed by the interpreter 502 according to the present exemplary embodiment is described below with reference to a flowchart illustrated in FIG. 8. FIG. 8 is the flowchart illustrating an example of the processing that can be performed by the interpreter 502 when the interpreter 502 performs RIP for page data of one page. Hereinafter, detailed processing in each step is described below.

First, in step S801, the interpreter 502 parses PPML script data of one page. Then, the interpreter 502 rasterizes the parsed page into the RAM 402. The parsed page serves as a processing target page in the following processing. As described above, an example of an analysis unit according to the present exemplary embodiment can be realized, for example, by performing the processing of step S801.

Next, in step S802, the interpreter 502 sends the processing target page to the common page determination unit 503 and instructs the common page determination unit 503 to perform a common page matching determination.

If the common page determination unit 503 determines that the processing target page matches with one of the common pages registered in the common page table 507, the interpreter 502 receives a resource ID of the matched page and a flag that indicates that the processing target page matches with any one of the common pages. In the following description, this flag can be referred to as a matching flag. In the present exemplary embodiment, a value of the matching flag received by the interpreter 502 is set to "TRUE."

In the present exemplary embodiment, it is determined that the processing target page matches with any one of the common pages. However, if it is determined that the processing target page does not match with any one of the common pages registered in the common page table 507, the interpreter 502 receives the following information from the common page determination unit 503.

More specifically, the interpreter 502 receives a resource ID of the unmatched page and a matching flag whose value is set to "FALSE" from the common page determination unit 503.

Further, in a case where it is determined that the processing target page is not any one of the common page, the interpreter 502 receives a value indicating that it is not determined that the processing target page matches with any one of the common pages. For example, the interpreter 502 receives a resource ID having a negative value and a matching flag whose value is set to "FALSE" from the common page determination unit 503.

Figure 9:
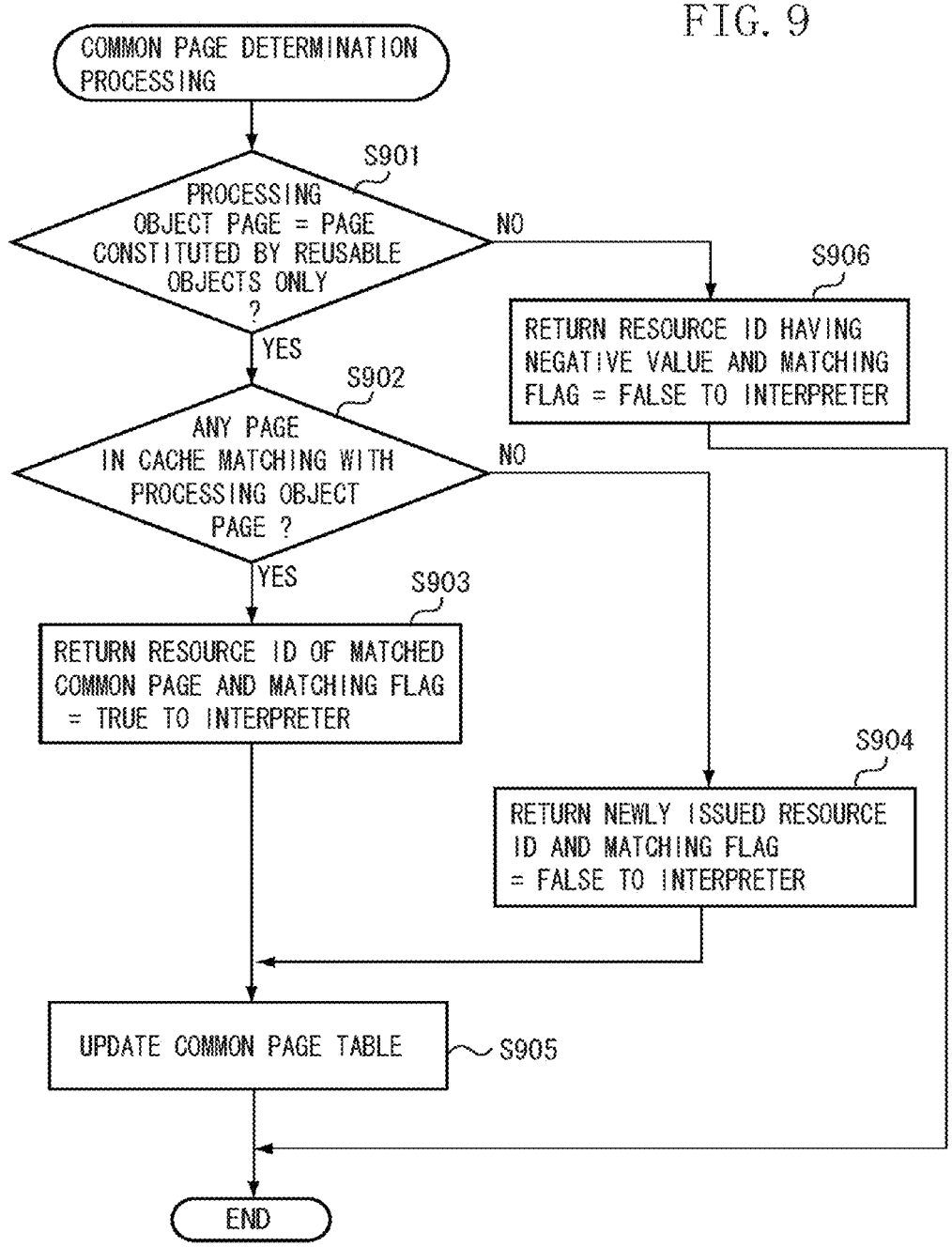
FIG. 9 is a flowchart illustrating an example of processing that can be performed by a common page determination unit according to an exemplary embodiment of the present invention.

The contents of the above-described processing to be performed by the common page determination unit 503 are described below with reference to FIG. 9.

Next, in step S803, the interpreter 502 determines whether the value of the matching flag received in step S802 is "TRUE." As a result of this determination, if it is determined that the value of the matching flag received in step S802 is "TRUE", i.e., in a case where the current processing target page matches with any one of the common pages registered in the common page table 507 (YES in step S803), the processing proceeds to step S804.

On the other hand, if it is determined that the value of the matching flag received in step S802 is not set to "TRUE, i.e., in a case where the current processing target page is not present in the common page table 507 (NO in step S803), the processing proceeds to step S805.

When the processing proceeds to step S804, the interpreter 502 instructs the cache manager 505 to output the RIP completed data 703 of the matched common page referring to the common page cache 508.

The processing performed by step S804 is useful to speedily accomplish the RIP because the RIP completed data 703 can be output without performing the RIP for the current processing target page.

As described above, an example of an output unit according to the present exemplary embodiment can be realized, for example, by performing the processing of step S804.

On the other hand, when the processing proceeds to step S805, the interpreter 502 interprets the current processing target page. Next, in step S806, the interpreter 502 sends a rendering command of the processing target page interpreted in step S805 to the renderer 504. Namely, the interpreter 502 instructs the renderer 504 to rasterize the processing target page.

Thus, the renderer 504 performs the RIP for the processing target page. Then, the renderer 504 sends the RIP completed data to the output unit 506. The printer 204 generates a print output based on the RIP completed data.

As described above, in the present exemplary embodiment, for example, the RIP is an example of rendering processing and the RIP completed data is an example of rendering processing completed data. An example of a generation unit according to the present exemplary embodiment can be realized, for example, by performing the processing of step S806. In the present exemplary embodiment, the rendering processing completed data includes not only the RIP completed data but also, for example, intermediate data.

Next, in step S807, the interpreter 502 determines whether the resource ID received from the common page determination unit 503 in step S802 has a positive value.

As a result of this determination, if it is determined that resource ID received from the common page determination unit 503 has a positive value, i.e., in a case where the processing target page is one of the common pages although the processing target page is not involved in the common page table 507 (YES in step S807), the processing proceeds to step S808. When the processing proceeds to step S808, RIP completed data of the processing target page is stored in the common page cache 508.

On the other hand, if it is determined that the resource ID received from the common page determination unit 503 is not a positive value (NO in step S807), the interpreter 502 terminates the processing of the flowchart illustrated in FIG. 8.

When the processing proceeds to step S808, the interpreter 502 requests the renderer 504 to transmit the RIP completed data of the processing target page and receives the RIP completed data. Then, the interpreter 502 sends the RIP completed data of the processing target page to the cache manager 505. The interpreter 502 instructs the cache manager 505 to register the RIP completed data of the processing target page in the common page cache 508.

As described above, an example of a storage unit according to the present exemplary embodiment can be realized, for example, by performing the processing of step S808. Further, for example, the RIP completed data stored in the RAM 402 and page data serving as a generation source of the RIP completed data can be mutually associated by using the resource ID fields 601 and 701 and the pointer fields 604 and 702.

As described above, the common page determination unit 503 receives an instruction from the interpreter 502 when the processing of step S802 illustrated in FIG. 8 is performed.

In response to the instruction received from the interpreter 502, the common page determination unit 503 determines whether the current processing target page is a common page and further the common page determination unit 503 confirms the presence of any common page that matches with the processing target page.

An example of the processing to be performed by the common page determination unit 503 according to the present exemplary embodiment is described below with reference to the flowchart illustrated in FIG. 9. FIG. 9 is the flowchart illustrating an example of the processing to be performed by the common page determination unit 503.

First, in step S901, the common page determination unit 503 selects common page candidates by determining whether the objects constituting the processing target page are all reusable objects. In general, an object included in a common page is frequently reused. Therefore, the processing to be performed in step S901 is based on such a presumption that, if an application can output the PPML, all objects included in a common page are output as reusable objects.

Performing the processing of step S901 is effective to avoid any useless matching determination processing from being performed between a page that cannot be a common page and the common pages recorded in the common page table 507.

As described above, an example of an extraction unit according to the present exemplary embodiment can be realized, for example, by performing the processing of step S901.

As a determination result in step S901, if it is not determined that the objects constituting the processing target page are all reusable objects (NO in step S901), the processing proceeds to a below-described step S906. On the other hand, in a case where it is determined that the objects constituting the processing target page are all reusable objects (YES in step S901), the processing proceeds to step S902.

When the processing proceeds to step S902, the common page determination unit 503 searches a "common page in the common page cache 508" that matches with the processing target page that was determined as the common page candidate in step S901.

Then, the common page determination unit 503 determines whether the common page that matches with the processing target page is present in the common page cache 508. The processing in step S902 is a measure for utilizing the characteristics of the PPML and is effective to reduce "the number of times of the matching determination." Detailed contents of the processing to be performed in step S902 are described below with reference to FIG. 10.

As described above, an example of a determination unit according to the present exemplary embodiment can be realized, for example, by performing the processing of step S902.

As a determination result in step S902, if it is determined that the common page that matches with the processing target page is present (YES in step S902), the processing proceeds to step S903. Otherwise, the processing proceeds to step S904.

When the processing proceeds to step S903, the common page determination unit 503 returns a resource ID of the common page that was determined as matching with the processing target page in step S902 and a matching flag whose value is set to "TRUE" to the interpreter 502.

Through the processing of step S903, the processing in step S804 illustrated in FIG. 8 can be performed. Thus, the interpreter 502 can reuse the RIP completed data of the common page having the resource ID received from the common page determination unit 503. Then, the processing proceeds to a below-described step S905.

On the other hand, when the processing proceeds to step S904, the common page determination unit 503 returns a newly issued resource ID and a matching flag whose value is set to "FALSE" to the interpreter 502. In the present exemplary embodiment, the common page determination unit 503 newly issues a resource ID having a positive value that is not stored in the resource ID field 601 of the common page table 507.

Through the processing of step S904, the processing of steps S806, S807, and S809 illustrated in FIG. 8 can be performed. The RIP of the processing target page and the RIP completed data of the processing target page are stored in the common page cache 508. Then, the processing proceeds to step S905.

When the processing proceeds to step S905, the common page determination unit 503 updates the common page table 507. The contents of the common page table 507 to be updated in step S905 are variable depending on the processing contents in the preceding step (i.e., step S903 or step S904).

The processing constantly performed in step S905 is common page update processing to be performed in arranging order. More specifically, the common page determination unit 503 updates the transition history field 602 and the cumulative number of times field 603 illustrated in FIG. 6.

The processing to be performed in step S905 only when the processing of step S904 is executed includes addition of data to be recorded in the resource ID field 601 and the pointer field 604 referring to the newly issued resource ID.

As described above, as a determination result in step S901, if it is not determined that the objects constituting the processing target page are all reusable objects (NO in step S901), the processing proceeds to step S906. When the processing proceeds to step S906, the common page determination unit 503 returns a resource ID having a negative value and a matching flag whose value is set to "FALSE" to the interpreter 502.

Through the processing in step S906, the processing in steps S806 and S807 illustrated in FIG. 8 can be performed and the RIP for the processing target page can be performed. In this case, the processing target page is not stored in the common page cache 508.

As described above, in step S902 of FIG. 9, the common page determination unit 503 searches the "common page in the common page table 507" that matches with the processing target page that was determined as the common page candidate in step S901.

An example of the processing to be performed by the common page determination unit 503 is described below with reference to a flowchart illustrated in FIG. 10. FIG. 10 is the flowchart illustrating an example of detailed processing to be executed in step S902 illustrated in FIG. 9.

First, in step S1001, the common page determination unit 503 determines whether the processing target page is the first record of the PPML job. As a result of this determination, if it is determined that the processing target page is the first record of the PPML job (YES in step S1001), the processing proceeds to step S1008.

In step S1008, the common page determination unit 503 determines that the processing target page does not match with any one of the pages stored in the common page cache 508. The processing in step S1008 is based on a presupposition that, in a case where the processing target page is the first record, there is no preceding page that has been already processed and therefore a page having the same contents cannot be registered in the common page table 507.

As an exceptional case that does not satisfy the above-described presupposition, common pages may be involved as part of a plurality of pages that constitute the first record. However, the above-described exceptional case is a rare case. Therefore, in the present exemplary embodiment, the common page determination unit 503 performs the processing of step S1008 based on the above-described presupposition.

If the processing of step S1001 is performed in such an exceptional case that does not satisfy the above-described presupposition, the storage capacity of the RAM 402 is uselessly used for the recording of the common pages, i.e., a plurality of pages having the same contents, because these pages are registered as different caches.

As a method capable of solving the above-described drawback, it is useful to skip or omit the processing to be executed in step S1001. In this case, two or more pages included in the first record are subjected to the matching determination.

Although the present exemplary embodiment uses the terminology "record", the PPML does not include any actually available specification for designating a hierarchy that corresponds to a record in a document hierarchical structure. Therefore, there is no method for directly identifying a page and a record to which the page belongs based on a description of the PPML. Hence, in the following description, each DOCUMENT element that serves as an element constituting the hierarchical structure of the PPML corresponds to one record.

In step S1001, if it is determined that the processing target page is not the first record of the PPML job (NO in step S1001), the processing proceeds to step S1002. When the processing proceeds to step S1002, the common page determination unit 503 determines whether the processing target page is the first page of the record.

As a result of this determination, if it is determined that the processing target page is the first page of the record (YES in step S1002), the processing proceeds to a below-described step S1006.

In step S1006, the common page determination unit 503 performs search processing peculiar to the first page.

On the other hand, if it is determined that the processing target page is the second page of the record or another page that follows the second page (NO in step S1002), the processing proceeds to step S1003.

When the processing proceeds to step S1003 (i.e., when determinations are negated in both steps S1001 and S1002), it can be concluded that the processing target page is the second record or another record that follows the second record and the processing target page is the second page or another page that follows the second page.

In step S1003, the common page determination unit 503 searches a common page that matches with the processing target page referring to the "page transition history" recorded in the transition history field 602 illustrated in FIG. 6. The "page transition history" is the record that indicates an appearance order of common pages.

Using the "page transition history" is effective to estimate a page in the common page table 507 that has a higher possibility of matching with the current processing target page. Accordingly, a common page in the cache that matches with the processing target page can be found at early timing.

As a result, the present exemplary embodiment can reduce the number of times of the matching determination performed between two or more pages. An example of a processing flow is described below with reference to FIG. 11.

Next, in step S1004, the common page determination unit 503 determines whether there is any common page that matches with the processing target page based on a result of the search performed in step S1003.

As a result of this determination, if it is determined that the common page that matches with the processing target page is present (YES in step S1004), the processing proceeds to step S1005.

In step S1005, the common page determination unit 503 determines that the page matching with the processing target page is present in the common page cache 508.

On the other hand, if it is determined that the common page matching with the processing target page is not present (NO in step S1004), the processing proceeds to step S1008. In step S1008, the common page determination unit 503 determines that the processing target page does not match with any one of the pages stored in the common page cache 508.

As described above, in a case where it is determined that the processing target page is the first page of the record (YES in step S1002), the processing proceeds to step S1006.

When the processing proceeds to step S1006, the common page determination unit 503 searches a common page that matches with the processing target page using the method peculiar to the first page. The present exemplary embodiment uses the page transition history in "the search processing for the second page and another page that follows the second page" to be performed in step S1003.

However, no page can precede the first page. Therefore, the page transition history cannot be used to estimate a page that has a higher possibility of matching with the processing target page. Hence, in the present exemplary embodiment, the data stored in the cumulative number of times field 603 in the common page table 507 illustrated in FIG. 6, which indicates "the number of times that the common page has appeared on the first page", can be used for the first page.

More specifically, the present exemplary embodiment identifies a common page that has a higher value in the number of times that the common page has appeared on the first page. The present exemplary embodiment regards the identified common page as having a higher priority in comparison.

Then, the present exemplary embodiment starts comparing each common page with the processing target page referring to the priority of the common page. Namely, the common page having the highest priority is first compared with the processing target page.

In other words, performing the comparison considering the number of times that the common page appears on the first page is effective to find, at early timing, the common page in the cache that matches with the processing target page.

As a result, the present exemplary embodiment can reduce the number of times of the matching determination performed between two or more pages. An example of an actual search flow to be performed in this case is described below with reference to FIG. 13.

In the present exemplary embodiment, the common page table 507 illustrated in FIG. 6 stores information indicating the number of times that the common page has appeared on the first page.

Alternatively, the common page table 507 illustrated in FIG. 6 can store information indicating the number of times that the common page has appeared on another page (e.g., the second page, the third page, or any other page that is determined beforehand).

It is now assumed that the processing target page is, for example, the third page of a record. In this case, the common page determination unit 503 refers to the common page table 507 and, if a specific common page has the highest value in the number of times in appearance on the third page, the common page determination unit 503 prioritizes a comparison between the specific common page and the processing target page over other comparisons.

Further, the latter method (i.e., the method considering the appearance on the predetermined page) can be used together with the former method (i.e., the method considering the transition history). In this case, a priority value for each common page in the common page table 507 can be determined by obtaining a weighted average that can be calculated based on a priority value evaluated with reference to the transition history and a priority value evaluated with reference to the number of times that the common page has appeared on the predetermined page.

Next, in step S1007, the common page determination unit 503 determines whether there is any common page that matches with the processing target page based on a result of the search performed in step S1006.

As a result of this determination, if it is determined that the common page that matches with the processing target page is present (YES in step S1007), the processing proceeds to step S1005.

In step S1005, the common page determination unit 503 determines that the page matching with the processing target page is present in the common page cache 508.

On the other hand, if it is determined that the common page matching with the processing target page is not present (NO in step S1007), the processing proceeds to step S1008. In step S1008, the common page determination unit 503 determines that the processing target page does not match with any one of the pages stored in the common page cache 508.

As described above, in step S1003 of FIG. 10, the common page determination unit 503 estimates the common page that has a higher possibility of matching with the processing target page with reference to the "page transition history" recorded in the transition history field 602 illustrated in FIG. 6.

Then, the common page determination unit 503 successively performs the matching determination between each common page and the processing target page considering the matching possibility of the common page.

An example of the processing to be performed by the common page determination unit 503 is described below with reference to FIGS. 11 and 12. FIG. 11 is a flowchart illustrating an example of detailed processing to be performed in steps S1003 and S1004 illustrated in FIG. 10. FIG. 12 schematically illustrates an example of the processing to be performed in step S1003 illustrated in FIG. 10.

According to an example illustrated in FIG. 12, the processing of the first to third records is thoroughly accomplished for all pages contained in each of the first to third records. Further, the processing of the fourth record is already accomplished for the first and second pages. In other words, only the third page of the fourth record remains unprocessed as a target page to be processed (i.e., a processing target page 1202).

First, in step S1101, the common page determination unit 503 acquires resource IDs of two pages that primarily and secondarily precede the processing target page from the common page table 507. According to the example illustrated in FIG. 12, the page that primarily precedes the processing target page 1202 is a page B 1203 (resource ID=002) of the fourth record and the page that secondarily precedes the processing target page 1202 is a page A 1204 (resource ID=001) of the fourth record.

In a case where the processing target page is the second page, the page that secondarily precedes the processing target page 1202 is not present. In this case, the common page determination unit 503 acquires only one resource ID of the page that primarily precedes the processing target page 1202.

Next, in step S1102, the common page determination unit 503 determines a priority value in comparison for each common page to be compared with the processing target page based on the two resource IDs acquired in step S1101.

In the present exemplary embodiment, the following categories (1) to (3) can be used as an example of the criterion for the priority determination.

(1) A common page corresponding to a transition history that matches with two consecutive pages primarily and secondarily preceding the processing target page.

(2) A common page corresponding to a transition history that matches with the page primarily preceding the processing target page.

(3) A common page corresponding to a transition history that does not match with the page primarily preceding the processing target page.

According to this example, the common page classified into the category (1) has the highest priority. The common page classified into the category (3) has the lowest priority.

An example of a priority allocation process is described below in more detail. As described in step S1101, according to the example illustrate in FIG. 12, the page that primarily precedes the processing target page 1202 is the page B 1203 (resource ID=002) and the page that secondarily precedes the processing target page 1202 is the page A 1204 (resource ID=001).

For example, the transition history "A→B→C" indicated by a dotted line in FIG. 12 matches with the transition of the page A 1204 that secondarily precedes the processing target page and the transition of the page B 1203 that primarily precedes the processing target page 1202.

Accordingly, the common page C corresponding to the transition history "A→B→C" can be evaluated as a common page having the highest priority.

Further, for example, a transition history "F→B→D" can match with the transition of the page 1203 that primarily precedes the processing target page 1202 and the transition of the processing target page 1202. However, the transition history "F→B→D" does not match with the transition of the page 1204 that secondarily precedes the processing target page 1202.

Accordingly, a common page D corresponding to the transition history "F→B→D" can be evaluated as a common page having the second highest priority.

Moreover, for example, a transition history "F→B" does not match with the transition of the page 1203 that primarily precedes the processing target page 1202 and the transition of the processing target page 1202. Therefore, the common page B corresponding to the transition history "F→B" can be evaluated as a common page having the lowest priority. In this case, the priority value of each common page is written in parentheses on the right side of each transition history illustrated in FIG. 12.

According to the above-described criterion for the priority determination, a transition history "A→B→K" has a priority value that is identical to the priority value of the transition history "A→B→C." In this case, the transition history having a larger value in the number of appearance times can be evaluated as having a higher priority.

For example, it is assumed that the transition history "A→B→C" has appeared two times and the transition history "A→B→K" has appeared only one time. In this case, the transition history "A→B→C" can be evaluated as having a higher priority.

According to the example illustrated in FIG. 12, the transition history having the highest priority is the transition history "A→B→C." Therefore, according to the above-described criterion for the priority determination, there is a higher possibility that the processing target page is the common page C (resource ID=003).

Therefore, in the processing of step S1103 that follows step S1102, the common page determination unit 503 successively performs the comparison between each common page and the processing target page with reference to the priority of the common page. More specifically, the common page determination unit 503 prioritizes (first performs) the matching determination between the common page C and the processing target page because the common page C has a higher priority.

Accordingly, the common page determination unit 503 can quickly find the common page that matches with the processing target page. As a result, the present exemplary embodiment can reduce the number of times of the matching determination.

As described above in step S1102, in a case where the processing target page is the second page, only one resource ID of the page that primarily precedes the processing target page can be acquired. In this case, the criterion for the priority determination needs to be changed to use a method that does not require the resource IDs of two pages that primarily and secondarily precede the processing target page.

In this case, for example, the criterion for the priority determination can be changed in the following manner.

More specifically, if a common page can be derived from a transition history matching with the page that primarily precedes the processing target page, this common page is regarded as a common page having the highest priority.

On the other hand, if a common page can be derived from any transition history that does not match with the page primarily preceding the processing target page, this common page is regarded as a common page having the lowest priority.

In the present exemplary embodiment, the transition history is a page transition of three pages. However, the number of pages storable as a transition history is not limited to three pages. For example, a page transition of four or more pages can be stored as a transition history in the common page table 507. Further, a page transition of only two pages can be stored as a transition history in the common page table 507.

The above-described criterion for the priority determination is a mere example. Any other criterion for the priority determination can be used to determine priority values.

As described above, an example of the determination unit according to the present exemplary embodiment can be realized, for example, by performing the processing of step S1102. Further, an example of a second storage unit according to the present exemplary embodiment can be realized, for example, by the transition history field 602 that can store transition history data.

Next, in step S1103, the common page determination unit 503 successively performs the comparison between each common page and the processing target page according to the priority of the common page determined in step S1102. An example of a flow of the processing to be performed in step S1103 is described below with reference to FIG. 13.

Next, in step S1104, the common page determination unit 503 determines whether there is any common page that matches with the processing target page based on a result of the comparison performed in step S1103.

As a result of this determination, if it is determined that the common page that matches with the processing target page is present (YES in step S1104), the processing proceeds to step S1105.

In step S1105, the common page determination unit 503 determines that the common page that matches with the processing target page is present in the common page table 507 (i.e., the common page cache 508).

On the other hand, if it is determined that the common page that matches with the processing target page is not present (NO in step S1104), the processing proceeds to step S1106.

In step S1106, the common page determination unit 503 determines that the common page that matches with the processing target page is not present in the common page table 507 (i.e., the common page cache 508).

Figure 10:
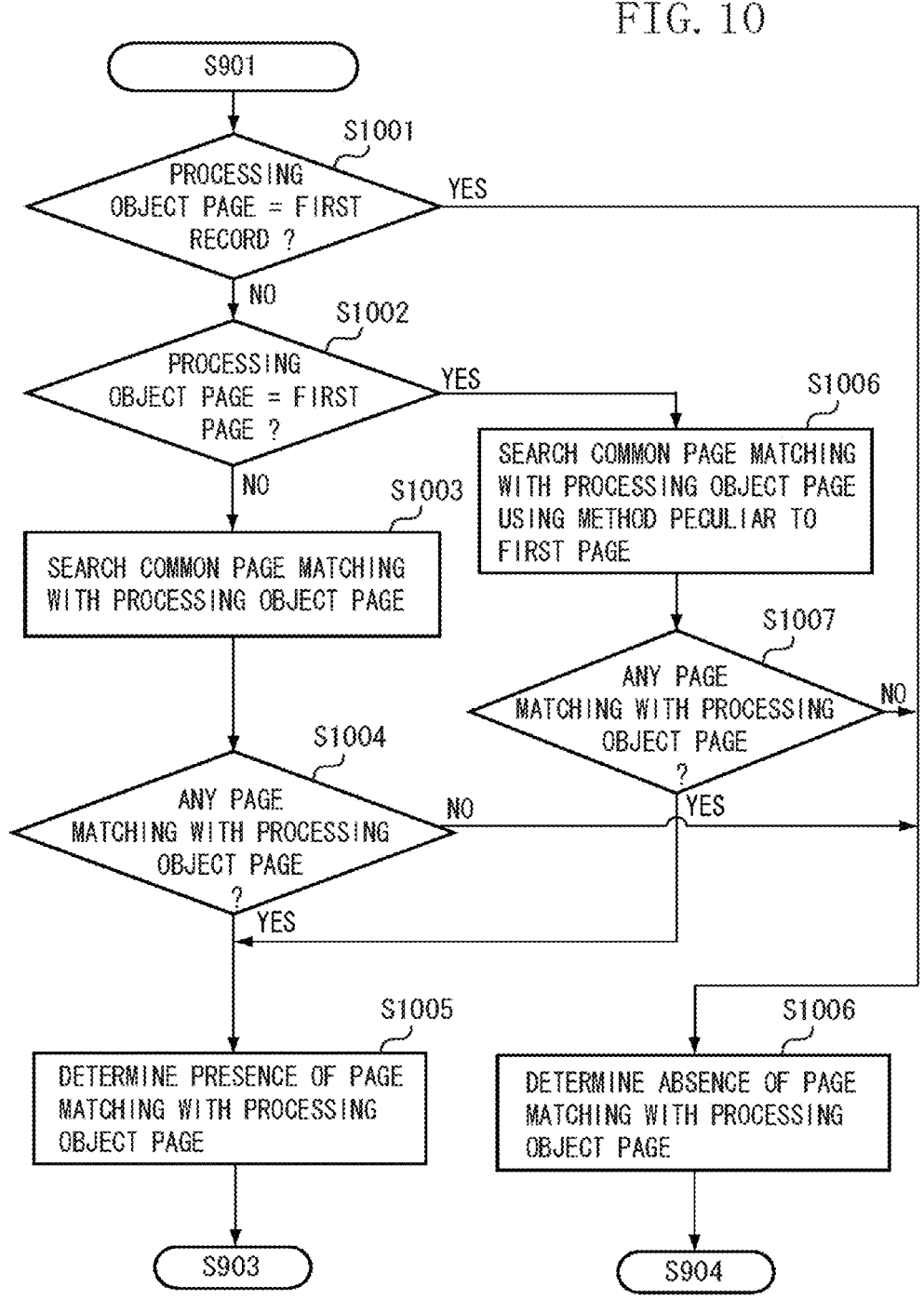
FIG. 10 is a flowchart illustrating an example of detailed processing to be performed in step S902 of FIG. 9.
Figure 11:
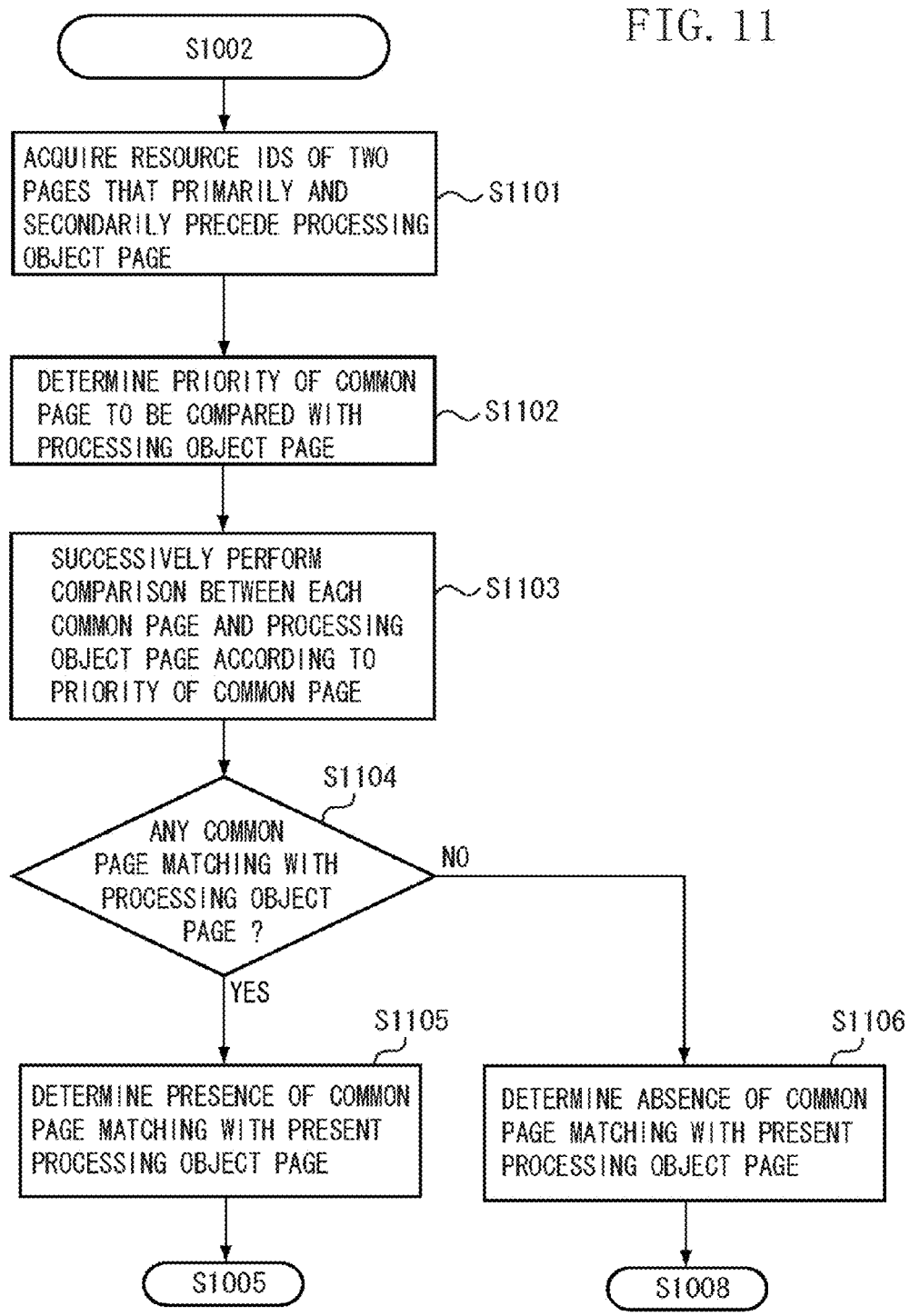
FIG. 11 is a flowchart illustrating an example of detailed processing to be performed in steps S1003 and S1004 of FIG. 10.

In steps S1007 illustrated in FIG. 10 and in step S1104 illustrated in FIG. 11, the common page determination unit 503 performs the matching determination processing between the processing target page and each common page to be compared with reference to the comparison priority.

Figure 13:
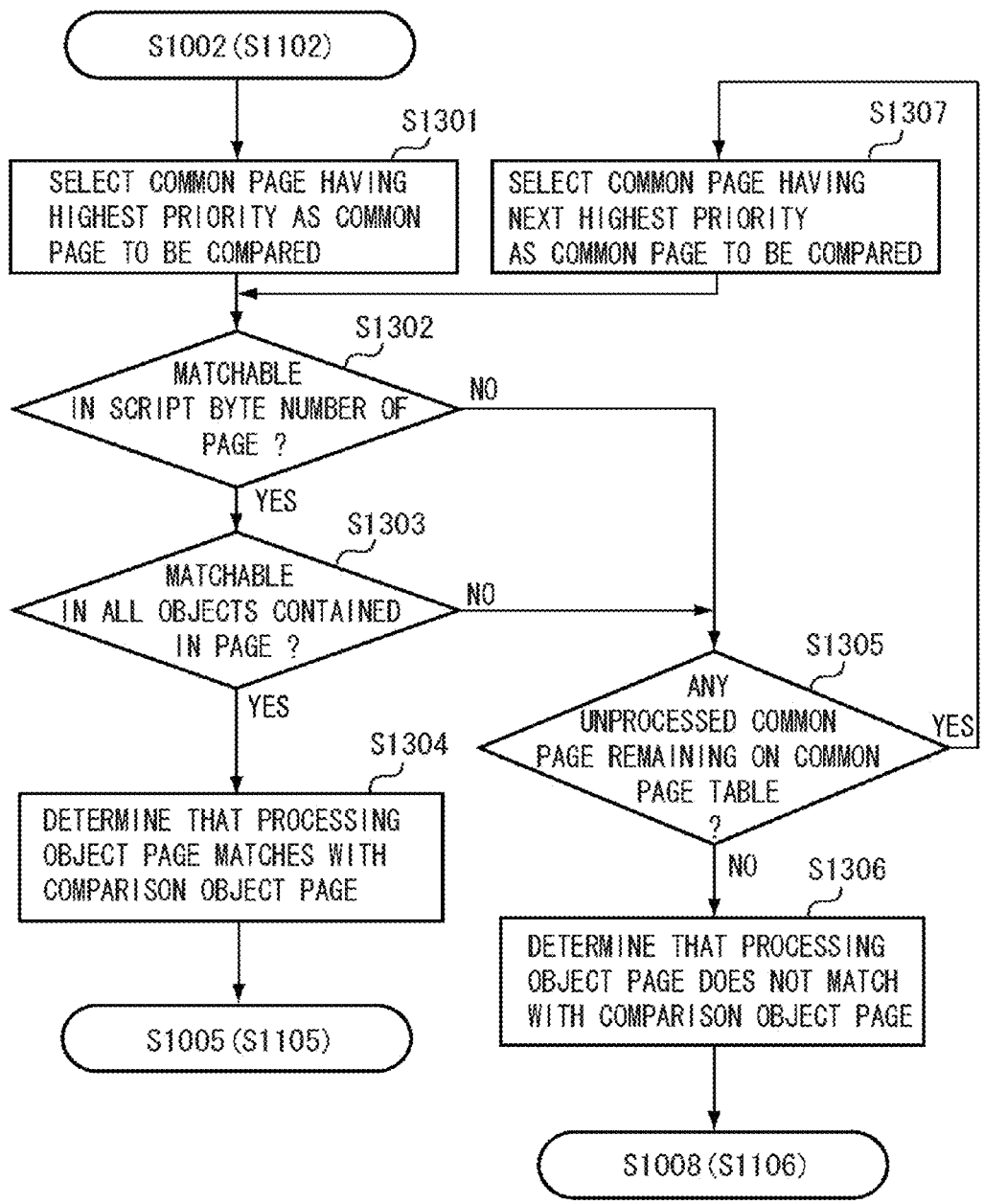
FIG. 13 is a flowchart illustrating an example of detailed processing to be performed in steps S1006 and S1007 of FIG. 10 and steps S1103 and S1104 of FIG. 11.

An example of the processing to be performed by the common page determination unit 503 according to the present exemplary embodiment is described below with reference to a flowchart illustrated in FIG. 13. FIG. 13 is the flowchart illustrating an example of detailed processing to be performed in steps S1006 and S1007 illustrated in FIG. 10 and in steps S1103 and S1104 illustrated in FIG. 11.

First, in step S1301, the common page determination unit 503 performs the processing described in step S1007 illustrated in FIG. 10 or in step S1104 illustrated in FIG. 11. More specifically, the common page determination unit 503 selects the common page having the highest priority as a common page to be compared.

In step S1007 illustrated in FIG. 10, the common page determination unit 503 selects, as the common page having the higher priority, the common page having the largest value in the cumulative number of times field 603 in the common page table 507 illustrated in FIG. 6.

On the other hand, in step S1104 illustrated in FIG. 11, the common page determination unit 503 selects, as the common page having the higher priority, the common page determined based on the criterion for the priority determination described in step S1102 of FIG. 11.

In the present exemplary embodiment, it is useful to store information indicating each common page that has been already compared with the processing target page in the RAM 402. In this case, the common page determination unit 503 does not perform comparison processing for the common pages already registered in the RAM 402.

Next, in step S1302, the common page determination unit 503 determines whether a script byte number of the processing target page matches with a script byte number of the common page to be subjected to the matching determination. As a result of this determination, if it is determined that the script byte number of the processing target page does not match with the script byte number of the common page to be subjected to the matching determination (NO in step S1302), the processing proceeds to a below-described step 1305.

As described above, for example, the script byte number is an example of script information amount according to the present exemplary embodiment. An example of an information amount determination unit according to the present exemplary embodiment can be realized by performing the processing of step S1302.

On the other hand, if it is determined that the script byte number of the processing target page matches with the script byte number of the common page to be subjected to the matching determination (YES in step S1302), the processing proceeds to a below-described step 1303.

When the processing proceeds to step S1303, the common page determination unit 503 determines whether all objects contained in the processing target page are identical to all objects contained in the common page subjected to the matching determination.

In the present exemplary embodiment, the common page determination unit 503 first selects a foreground object (not a background object) when the common page determination unit 503 starts the object matching determination in step S1303.

Through the above-described processing, in a case where two pages to be compared in the matching determination are mutually similar in the background but different in the foreground, the common page determination unit 503 can quickly determine that the compared pages do not match with each other.

In other words, the present exemplary embodiment can reduce the number of times of the matching determination to be performed between two or more objects.

In the above-described processing, it is unnecessary to directly perform a determination to identify an object that serves as the foreground or an object that serves as the background.

In many cases, according to the PPML script, an object described at an initial part of a page is a background object and an object described at a final part of the page is a foreground object.

As a reason for the above-described features, the grammar of the PPML regulates the rendering processing so that an object described earlier is overwritten by an object described later. The above-described description method is widely used by many applications that can output PPML scripts.

Hence, the common page determination unit 503 starts with the foreground object in successively performing the object matching determination.

Figure 14:
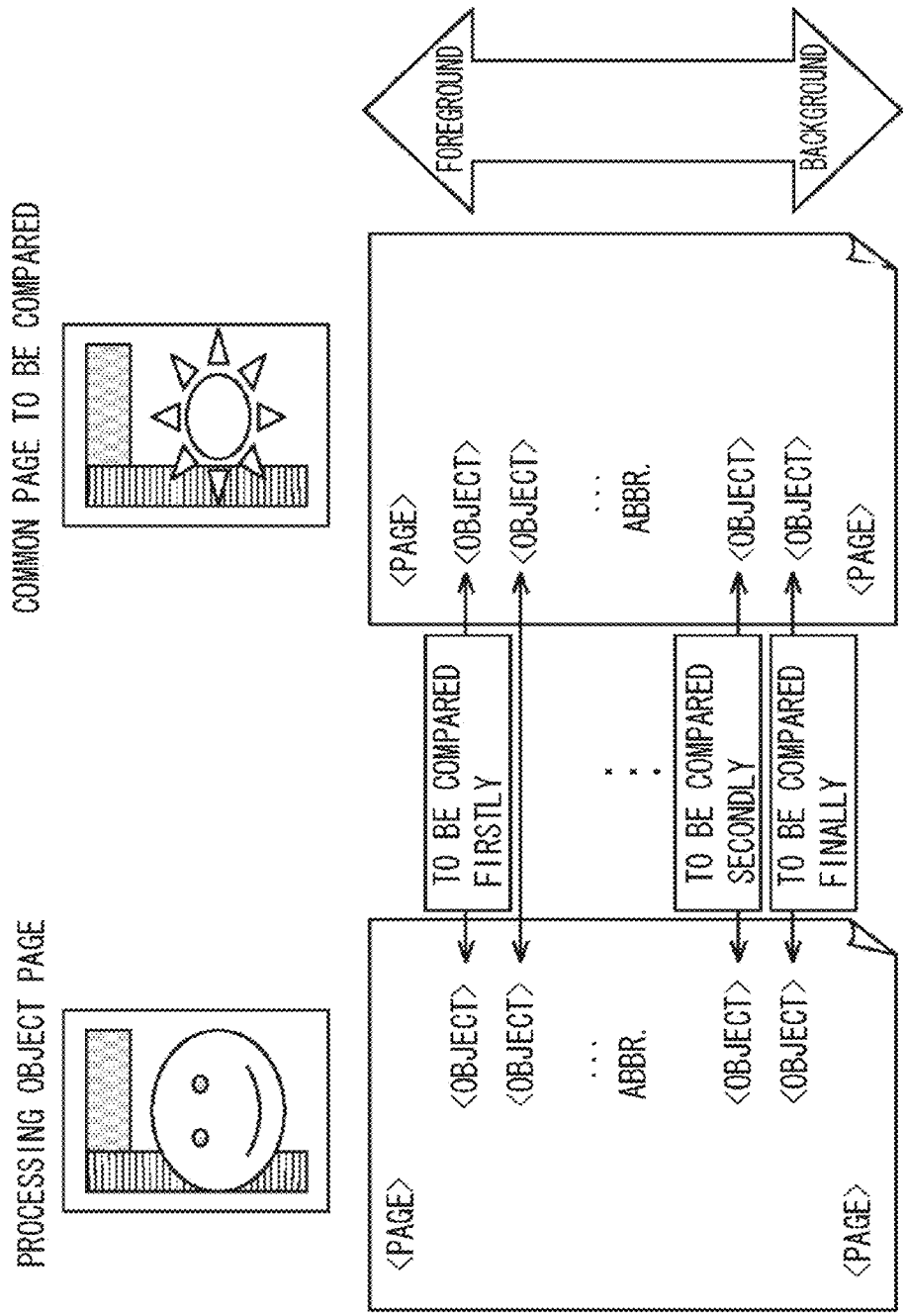
FIG. 14 illustrates a method for performing a matching determination between objects contained in a processing target page and objects contained in a common page that is subjected to the matching determination according to an exemplary embodiment of the present invention.

In the present exemplary embodiment, as illustrated in FIG. 14, the common page determination unit 503 starts the determination with the object described at the final part of the page and finally performs the determination for the object described at the initial part of the page.

FIG. 14 schematically illustrates an example of a method for performing the matching determination between the objects contained in the processing target page and the objects contained in the common page to be subjected to the matching determination.

As described above, an example of an object determination unit according to the present exemplary embodiment can be realized, for example, by performing the processing of step S1303.

In the present exemplary embodiment, the common page determination unit 503 successively performs the object matching determination in a backward direction starting with the foreground object.

Alternatively, the common page determination unit 503 can successively perform the object matching determination in a forward direction starting with the background object.

In this case, the common page determination unit 503 can start with the object first described at the initial part of the page in the PPML script in successively performing the matching determination.

As a determination result in step S1303, if it is determined that the all objects contained in the processing target page match with the all objects contained in the common page subjected to the matching determination (YES in step S1303), the processing proceeds to step S1304.

When the processing proceeds to step S1304, the common page determination unit 503 determines that the processing target page matches with the common page subjected to the matching determination.

On the other hand, if it is not determined that the all objects contained in the processing target page match with the all objects contained in the common page subjected to the matching determination (NO in step S1303), the processing proceeds to step S1305.

When the processing proceeds to step S1305, the common page determination unit 503 determines whether there is any common page remaining in the common page table 507 that is not yet compared with the processing target page.

As a determination result in step S1305, if it is determined that the common page not yet compared with the processing target page is not present in the common page table 507 (NO in step S1305), the processing proceeds to step S1306.

When the processing proceeds to step S1306, the common page determination unit 503 determines that the processing target page does not match with the common page subjected to the matching determination.

On the other hand, if it is determined that the common page not yet compared with the processing target page is present in the common page table 507 (YES in step S1305), the processing proceeds to step S1307.

When the processing proceeds to step S1307, the common page determination unit 503 newly selects a common page that has the second highest priority (i.e., a higher priority following the priority of the previously selected common page) as a common page to be subjected to the matching determination.

Then, the common page determination unit 503 performs the processing of step S1302 and the subsequent steps for the newly selected common page.

In this manner, the common page determination unit 503 repetitively performs the processing of step S1302 and subsequent steps for all common pages having the resource IDs registered in the common page table 507 with reference to the priority of each common page.

The method for determining whether the processing target page matches with the common page subjected to the matching determination is not limited to the example method illustrated in FIG. 13. For example, another example method may include obtaining a hash value of a script of the common page beforehand and determining whether the obtained hash value matches with a hash value of the processing target page.

The above-described method for determining the matching in the script byte number can be replaced by the method using the hash value. The above-described method for determining the matching in the script byte number can be employed together with the method using the hash value.

Further, in FIG. 13, as described in the processing of step S1305, the common pages registered in the common page table 507 are all objects to be compared with the processing target page. However, there may be a very large number of common pages to be compared with the processing target page for the matching determination.

In such a case, the processing for reusing the RIP completed data of the common page through the above-described matching determination processing may take a longer time than the interpretation and rasterization processing.

To solve this problem, the common page determination unit 503 can perform the matching determination for only a limited part of the common pages registered in the common page table 507, instead of performing the matching determination for all of the common pages registered in the common page table 507.

For example, the common page determination unit 503 can perform the matching determination for a limited number of common pages that have priority values higher than a predetermined rank. For example, the following method can be used to determine the above-described predetermined rank.

Figure 15:
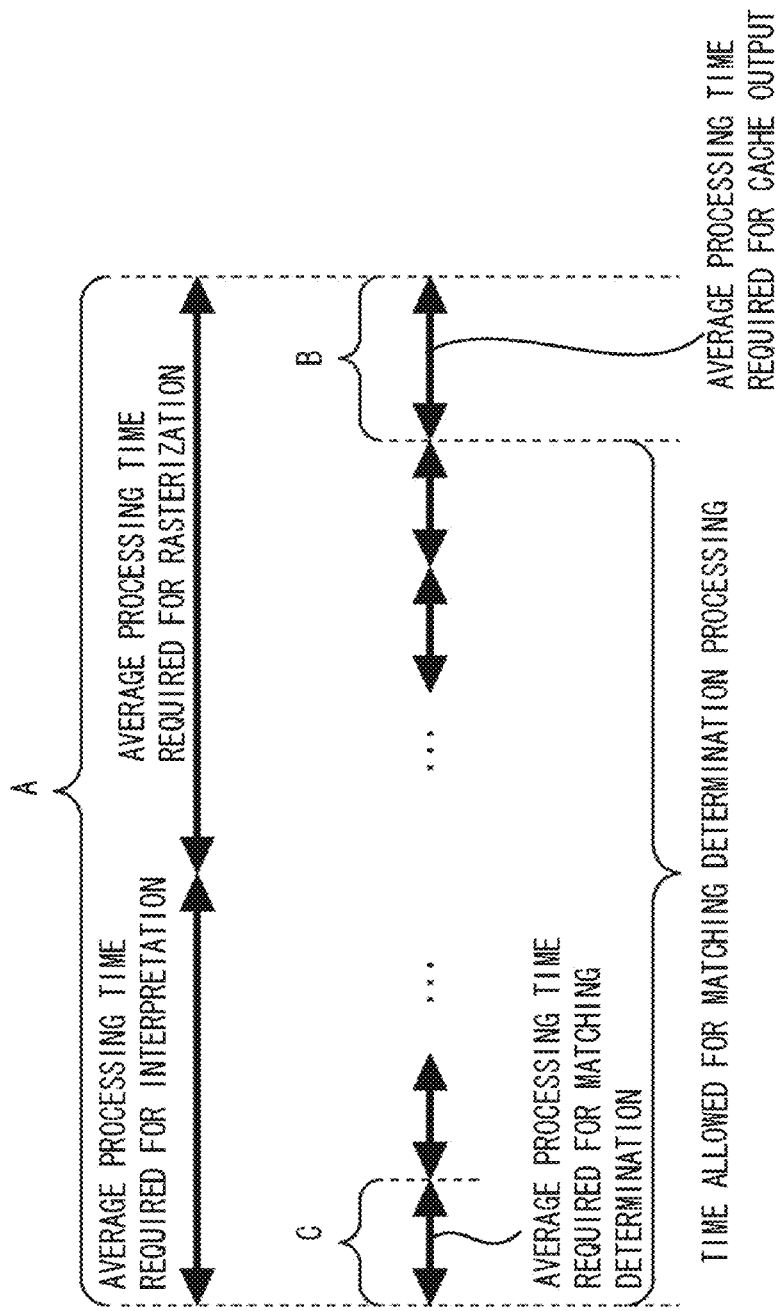
FIG. 15 illustrates a method for obtaining an allowable number of times of the matching determination according to an exemplary embodiment of the present invention.

The method includes storing, in the RAM 402, an average time required for the interpreter 502 illustrated in FIG. 5 to interpret the data of one page (i.e., an average time required to perform the processing of step S805 illustrated in FIG. 8) and an average time required for the renderer 504 to rasterize the data of one page. In FIG. 15, time A represents a sum of the above-described two average times.

The method further includes storing, in the RAM 402, an average time required for the cache manager 505 to output RIP completed data of one page (i.e., an average time required to perform the processing of step S804 illustrated in FIG. 8). In FIG. 15, time B represents the average time required for the cache manager 505 to output RIP completed data of one page.

The method further includes storing, in the RAM 402, an average time required to perform the matching determination one time between the compared pages. In FIG. 15, time C represents the average time required to perform the matching determination one time between the compared pages.

In this case, the common page determination unit 503 can obtain an allowable number of times of the matching determination, i.e., the predetermined rank, using the following formula (1).

$$\text{Allowable number of times of the matching determination} = (A-B)/C \quad (1)$$

FIG. 15 illustrates an example of a method for calculating the allowable number of times of the matching determination according to the present exemplary embodiment.

In FIG. 15, an "average processing time required for interpretation" represents the average time required for the interpreter 502 to interpret the data of one page (i.e., the average time required to perform the processing of step S805 illustrated in FIG. 8). An "average processing time required for rasterization" represents the average time required for the renderer 504 to rasterize the data of one page.

An "average processing time required for cache output" represents the average time required for the cache manager 505 to output RIP completed data of one page (i.e., the average time required to perform the processing of step S804 in FIG. 8).

An "average processing time required for matching determination" represents the average time required to perform the matching determination one time between the compared pages.

As illustrated in FIG. 15, the time A is equal to a sum of the "average processing time required for interpretation" and the "average processing time required for rasterization." The time B is equal to the "average processing time required for cache output."

A difference between the time A and the time B can be regarded as an available time for the matching determination processing. Thus, the allowable number of times of the matching determination can be obtained by dividing the above-described difference (=A−B) by the "average processing time required for matching determination" (=C).

According to the above-described method, it is necessary to measure the time A, the time B, and the time C to calculate the allowable number of times of the matching determination according to the formula (1). For example, an off-line measurement can be employed to measure the time A, the time B, and the time C. An on-line measurement can be also employed to measure the time A, the time B, and the time C.

More specifically, when a processing target PPML job is performed, all of the time A, the time B, and the time C can be measured before the processing of an initial predetermined number of records is completed. Then, the predetermined rank can be calculated using the formula (1). The obtained predetermined rank can be applied to the remaining records.

Alternatively, all of the time A, the time B, and the time C can be measured beforehand in a plurality of PPML jobs that are different from the processing target PPML job. The predetermined rank can be calculated using the formula (1). The obtained predetermined rank can be applied to a processing target PPML job (i.e., a PPML job to be actually processed).

As described above, in determining whether to use the RIP completed data, the present exemplary embodiment determines whether the objects constituting the processing target page are all reusable objects. As a result of this determination, if it is not determined that the objects constituting the processing target page are all reusable objects, the present exemplary embodiment performs RIP on the processing target page without using the RIP completed data.

On the other hand, if it is determined that the objects constituting the processing target page are all reusable objects, the present exemplary embodiment determines whether a registered common page that matches with the processing target page is present in the common page table 507. As a result of this determination, if it is determined that the registered common page is present, the present exemplary embodiment reuses the RIP completed data. On the other hand, if it is determined that the registered common page is not present, the present exemplary embodiment performs RIP on the processing target page without using the RIP completed data.

Therefore, the present exemplary embodiment can simplify the processing for determining whether to reuse the RIP completed data.

More specifically, the present exemplary embodiment can reduce the number of times of the matching determination to be performed between two or more pages and further can reduce the number of times of the matching determination to be performed between two or more objects. Therefore, the present exemplary embodiment can speedily accomplish printing processing without reducing the effects obtained by the page-by-page basis cache processing.

In particular, in a case where the objects constituting the processing target page are all reusable objects, the present exemplary embodiment can omit the matching determination to be performed between two or more pages and can also omit the matching determination to be performed between two or more objects.

Accordingly, the present exemplary embodiment can simplify the processing for caching, on the page-by-page basis, the data described by the language (e.g., PPML) whose grammar does not enable to describe the information indicating a relationship between two or more pages that are mutually common and can further simplify the processing for reusing the cached data.

Further, in determining whether a registered common page that matches with the processing target page is present in the common page table 507, the present exemplary embodiment compares the processing target page with the first pages of the second and succeeding records by prioritizing a common page having been most frequently printed as the first page in the past printing processing.

On the other hand, in comparing the processing target page with the second and subsequent pages of the second and subsequent records, the present exemplary embodiment prioritizes a common page that corresponds to a transition of pages in a past printing job.

Therefore, the present exemplary embodiment can further simplify the processing for determining whether to reuse the RIP completed data.

Next, a second exemplary embodiment of the present invention is described below. In the above-described first exemplary embodiment, a common page having a higher possibility of matching with the processing target page can be estimated with reference to transition history data. Then, based on a result of the estimation, the first exemplary embodiment determines a priority of a common page to be compared with the processing target page for matching determination.

On the other hand, the second exemplary embodiment does not use the transition history data. The second exemplary embodiment determines a priority of a common page to be subjected to the matching determination based on information indicating a record having a page configuration similar to that of a record that contains the processing target page.

As described above, the second exemplary embodiment is different from the above-described first exemplary embodiment in the method for determining the priority of each common page to be compared with the processing target page for the matching determination.

Therefore, in the description of the present exemplary embodiment, components and portions similar to those described in the above-described first exemplary embodiment are denoted by the same reference numerals used in FIGS. 1 to 15 and the detailed descriptions of them are not repeated.

Figure 16:
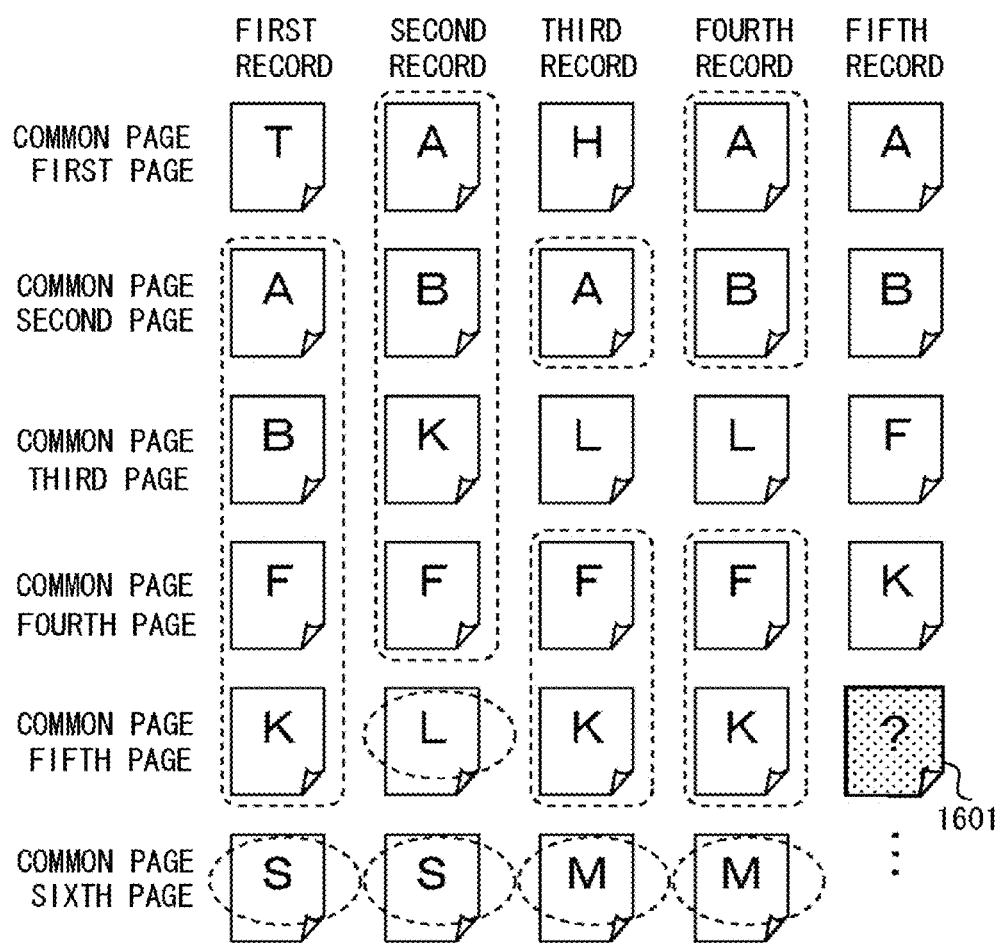
FIG. 16 schematically illustrates an example of a method for obtaining a degree of similarity in page configuration between two records according to an exemplary embodiment of the present invention.

FIG. 16 schematically illustrates an example of a method for obtaining a degree of similarity in the page configuration between two records. According to the example illustrated in FIG. 16, the fifth page of the fifth record is a processing target page 1601. The processing for other pages, i.e., from the first page of the first record to the fourth page of the fifth record (i.e., the page primarily preceding the processing target page), is already completed.

In this case, a method for obtaining the degree of similarity in the page configuration between two records is significant. In the present exemplary embodiment, for example, the degree of similarity in the page configuration between two records can be obtained in the following manner.

More specifically, the present exemplary embodiment evaluates the total number of pages constituting the record that contains the processing target page 1601 (i.e., the pages constituting the fifth record other than the processing target page 1601 according to the example illustrated in FIG. 16). The present exemplary embodiment further evaluates a degree of similarity in the order of pages arrayed to constitute the record.

Then, the present exemplary embodiment finalizes the degree of similarity by obtaining a weighted average of similarity values resulting from the above-described evaluation.

Then, the present exemplary embodiment performs the matching determination between the processing target page 1601 and each common page to be compared by prioritizing a common page contained in the record that has the highest degree of similarity.

More specifically, in successively performing the matching determination, the present exemplary embodiment starts with a page following a group of pages that matches with the common pages that constitute the record containing the processing target page 1601, among a plurality of records that are different from the record containing the processing target page 1601.

According to the example illustrated in FIG. 16, a common page or a group of common pages encircled by a rectangular dotted line is an element that matches with at least part of the common pages constituting the record that contains the processing target page 1601.

A common page encircled by an elliptic dotted line is an element that can serve as a target common page to be subjected to the matching determination.

According to the example illustrated in FIG. 16, the degree of similarity between a page configuration of the first record and a page configuration of the record containing the processing target page 1601 is highest. Therefore, a common page S has the highest priority.

The degree of similarity between a page configuration of the second record and the page configuration of the record containing the processing target page 1601 is second highest. Therefore, a common page L has the second highest priority.

The degree of similarity between a page configuration of the fourth record and the page configuration of the record containing the processing target page 1601 is third highest. Therefore, a common page M has the third highest priority.

As described above, the exemplary embodiment can determine the priority of each common page to be subjected to the matching determination based on the degree of similarity in the page configuration between two records. The exemplary embodiment can obtain effects similar to those described in the first exemplary embodiment.

According to the present invention, in a case where the objects contained in a script are all reusable objects, it is unnecessary to determine whether the page data used in description of the script matches with the already stored page data. Therefore, the present invention can simplify the processing for caching rendering completed data on the page-by-page basis and reusing the cached data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-304796 filed Nov. 28, 2008, which is hereby incorporated by reference herein in its entirety.

What is claimed is:

1. A print control apparatus comprising:
   an analysis unit configured to analyze a script containing page data described using a language that can describe reusable objects and variable objects differently from each other;
   an extraction unit configured to extract page data exclusively constituted by reusable objects, from the page data described in the script;
   a generation unit configured to generate rendering processing completed data by performing rendering processing on the page data extracted by the extraction unit;
   a storage unit configured to store the rendering processing completed data generated by the generation unit in association with page data serving as a generation source of the rendering processing completed data in a storage medium;
   a determination unit configured to compare the page data extracted by the extraction unit with page data already stored in the storage medium to determine whether the page data extracted by the extraction unit matches the page data already stored in the storage medium; and
   an output unit configured to output rendering processing completed data already stored in the storage medium in association with the page data in a case where the determination unit determines that the page data extracted by the extraction unit matches the page data already stored in the storage medium, instead of causing the generation unit to generate the rendering processing completed data.

2. The print control apparatus according to claim 1, further comprising:
   a second storage unit configured to store a transition of the page data extracted by the extraction unit in the storage medium; and
   a determination unit configured to determine a priority of page data to be compared with the page data described in the script based on the transition of the page data stored by the second storage unit,
   wherein the determination unit is configured to select page data already stored in the storage medium with reference to the priority determined by the determination unit, and is further configured to compare the selected page data with the page data described in the script to determine whether the selected page data matches the page data described in the script.

3. The print control apparatus according to claim 1, wherein the determination unit includes:
   an information amount determination unit configured to determine whether an information amount of the page data described in the script matches with an information amount of the page data already stored in the storage medium; and
   an object determination unit configured to determine whether objects contained in the page data described in the script match with objects contained in the page data already stored in the storage medium if the information amount determination unit determines that the information amount of the page data described in the script matches the information amount of the page data already stored in the storage medium,
   wherein, in a case where the information amount determination unit determines that the information amount of the page data described in the script does not match the information amount of the page data already stored in the storage medium, and in a case where the object determination unit determines that the objects contained in the page data described in the script do not match the objects contained in the page data already stored in the storage medium, it is determined that the page data described in the script does not match the page data already stored in the storage medium, and
   in a case where the object determination unit determines that the objects contained in the page data described in the script match the objects contained in the page data already stored in the storage medium, it is determined that the page data described in the script matches the page data already stored in the storage medium.

4. The print control apparatus according to claim 3, wherein the object determination unit is configured to start with an object serving as a foreground in the processing for determining whether the objects contained in the page data described in the script match the objects contained in the page data already stored in the storage medium.

5. The print control apparatus according to claim 1, wherein the determination unit is configured to determine whether page data of a part of a plurality of pages stored in the storage medium matches the page data described in the script.

6. The print control apparatus according to claim 5, wherein the part of the plurality of pages is a predetermined number of pages that correspond to a time obtained by subtracting a time required for outputting the rendering processing completed data from a time required for generating the rendering processing completed data from the page data of one page.

7. The print control apparatus according to claim 1, wherein in a case where the determination unit determines that the page data described in the script does not match the page data already stored in the storage medium, the generation unit is configured to generate rendering processing completed data by performing rendering processing on the page data.

8. The print control apparatus according to claim 1, wherein even in a case where the page data exclusively constituted by the reusable objects was not extracted by the extraction unit, the generation unit is configured to generate rendering processing completed data by performing rendering processing on the page data.

9. The print control apparatus according to claim 1, wherein the language is Personalized Print Markup Language (PPML).

10. A print control method comprising:
   analyzing a script containing page data described using a language that can describe reusable objects differently from objects to be rendered only one time;
   extracting page data exclusively constituted by reusable objects, from the page data described in the script;
   generating rendering processing completed data by performing rendering processing on the extracted page data;
   storing the generated rendering processing completed data in association with page data serving as a generation source of the rendering processing completed data in a storage medium;
   comparing the extracted page data with page data already stored in the storage medium to determine whether the extracted page data matches with the page data already stored in the storage medium; and
   outputting rendering processing completed data already stored in the storage medium in association with the page data in a case where it is determined that the extracted page data matches the page data already stored in the storage medium, instead of generating the rendering processing completed data.

11. A non-transitory computer-readable storage medium storing a computer program that causes a computer to perform a print control method, the method comprising:
   analyzing a script containing page data described using a language that can describe reusable objects differently from objects to be rendered only one time;
   extracting page data exclusively constituted by reusable objects, from the page data described in the script;
   generating rendering processing completed data by performing rendering processing on the extracted page data;
   storing the generated rendering processing completed data in association with page data serving as a generation source of the rendering processing completed data in a storage medium;
   comparing the extracted page data with page data already stored in the storage medium to determine whether the extracted page data matches the page data already stored in the storage medium; and
   outputting rendering processing completed data already stored in the storage medium in association with the page data in a case where it is determined that the extracted page data matches the page data already stored in the storage medium, instead of generating the rendering processing completed data.

* * * * *